(12) United States Patent
Hu et al.

(10) Patent No.: US 8,153,313 B2
(45) Date of Patent: Apr. 10, 2012

(54) HYBRID VOLTAGE SUPPLY APPARATUS, METHOD OF CONTROLLING THE SAME, AND ELECTRONIC SYSTEM EMPLOYING THE SAME AS POWER SUPPLY

(75) Inventors: Lei Hu, Yongin-si (KR); Young-Jae Kim, Seoul (KR); Hye-Jung Cho, Anyang-si (KR); Jae-yong Lee, Seongnam-si (KR); Young-soo Joung, Anseong-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1161 days.

(21) Appl. No.: 11/950,038

(22) Filed: Dec. 4, 2007

(65) Prior Publication Data

US 2008/0138680 A1    Jun. 12, 2008

(30) Foreign Application Priority Data

Dec. 4, 2006  (KR) .................. 10-2006-0121788
May 22, 2007 (KR) .................. 10-2007-0049945

(51) Int. Cl.
*H01M 8/06* (2006.01)

(52) U.S. Cl. ........ 429/427; 429/428; 429/430; 429/431; 429/432; 429/433; 429/442

(58) Field of Classification Search .................. 429/427, 429/428, 429, 430, 431, 432, 433, 442
See application file for complete search history.

(56) References Cited

U.S. PATENT DOCUMENTS

2004/0041473 A1* 3/2004 Deguchi .................. 307/82
* cited by examiner

*Primary Examiner* — Patrick Ryan
*Assistant Examiner* — Ben Lewis
(74) *Attorney, Agent, or Firm* — Lee & Morse

(57) ABSTRACT

A hybrid voltage supply apparatus, a method of controlling the same, and an electronic system employing the hybrid voltage supply apparatus as a power supply are provided. The hybrid voltage supply apparatus includes a hybrid voltage supply apparatus including a main power supply, an auxiliary power supply, and a first voltage adjustment unit which operates in any one of a feed-forward driving mode and a feedback driving mode according to at least one operating parameter of the main power supply, and adjusts an output voltage of the main power supply to a first predetermined DC voltage.

26 Claims, 17 Drawing Sheets

HYBRID VOLTAGE SUPPLY APPARATUS, METHOD OF CONTROLLING THE SAME, AND ELECTRONIC SYSTEM EMPLOYING THE SAME AS POWER SUPPLY

CROSS-REFERENCE TO RELATED APPLICATIONS

This application claims the benefit of Korean Patent Application Nos. 2006-121788, filed on Dec. 4, 2006 and 2007-49945, filed on May 22, 2007, in the Korean Intellectual Property Office, the disclosures of which are incorporated herein in their entirety by reference.

BACKGROUND OF THE INVENTION

1. Field of the Invention

An aspect of the present invention relates to a power supply of an electronic device, and more particularly, to a hybrid voltage supply apparatus in which an auxiliary power supply is combined with a main power supply, which is capable of operating a fuel cell adopted as the main power supply at a desired level, a method for controlling the hybrid voltage supply apparatus, and an electronic system employing the hybrid voltage supply apparatus as a power supply.

2. Description of the Related Art

A fuel cell is an electrochemical device for converting chemical energy of hydrogen and oxygen contained in hydrocarbon materials, such as methanol, ethanol, and natural gas, into electric energy. The fuel cell has attracted a lot of attention and development, since its energy conversion process is very efficient and friendly to the environment.

However, the fuel cell has a higher internal impedance than conventional chemical batteries, so its output voltage decreases as its output current increases. Also, since the fuel cell has a very slow response speed, the fuel cell cannot properly respond to a sharp change in a load current. In order to increase the efficiency of the fuel cell, it must be controlled to operate at an optimal operating point, at which a maximum output power is obtained. This requires the output voltage to be kept above the lowest voltage corresponding to the maximum output power.

A hybrid voltage supply apparatus includes a fuel cell as a main power supply, connected in parallel with a battery as an auxiliary power supply, and can share the load when the output voltage of the fuel cell is similar to the output voltage of the battery. However, since the output voltage of the fuel cell depends on the number of unit cells included in the fuel cell and the required power changes according to the status of a load, it is difficult to quickly balance the output voltage of the fuel cell with the output voltage of the battery.

SUMMARY OF THE INVENTION

An aspect of the present invention provides a hybrid voltage supply apparatus in which an auxiliary power supply is combined with a main power supply which always operates at a desired level regardless of the power required by a load.

Another aspect of the present invention provides a method for controlling a main power supply so that the main power supply always operates at a desired level, in a hybrid voltage supply apparatus in which an auxiliary power supply is combined with the main power supply.

Another aspect of the present invention provides an electronic system employing the hybrid voltage supply apparatus as a power supply.

According to an aspect of the present invention, there is provided a hybrid voltage supply apparatus including a main power supply; an auxiliary power supply; and a first voltage adjustment unit which operates in any one of a feed-forward driving mode and a feed-back driving mode according to at least one operating parameter of the main power supply, and adjusts an output voltage of the main power supply to a first predetermined DC voltage.

According to another aspect of the present invention, the hybrid voltage supply apparatus further includes a second voltage adjustment unit connected to the first voltage adjustment unit in parallel, which operates in a feed-back driving mode, and adjusts an output voltage of the auxiliary power supply to a second predetermined DC voltage; and a controller which controls the first voltage adjustment unit and the second voltage adjustment unit, so that the main power supply operates at a desired level in response to the operating parameter of the main power supply.

According to another aspect of the present invention, the hybrid voltage supply apparatus further includes a controller which controls the main power supply to charge the auxiliary power supply connected to an output side of the first voltage adjustment unit while operating at the desired level, and controls a driving mode of the first voltage adjustment unit in response to the operating parameter of the main power supply.

According to another aspect of the present invention, there is provided a control method of a hybrid voltage supply apparatus, the hybrid voltage supply apparatus including a main power supply, an auxiliary power supply, and a first voltage adjustment unit which operates in any one of a feed-forward driving mode and a feed-back driving mode and adjusts an output voltage of the main power supply to a first predetermined DC voltage, the control method including determining an operating condition of the main power supply by comparing at least one operating parameter to a corresponding reference value; and controlling a driving mode of the first voltage adjustment unit so that the main power supply operates at a desired level on the basis of the determination result.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
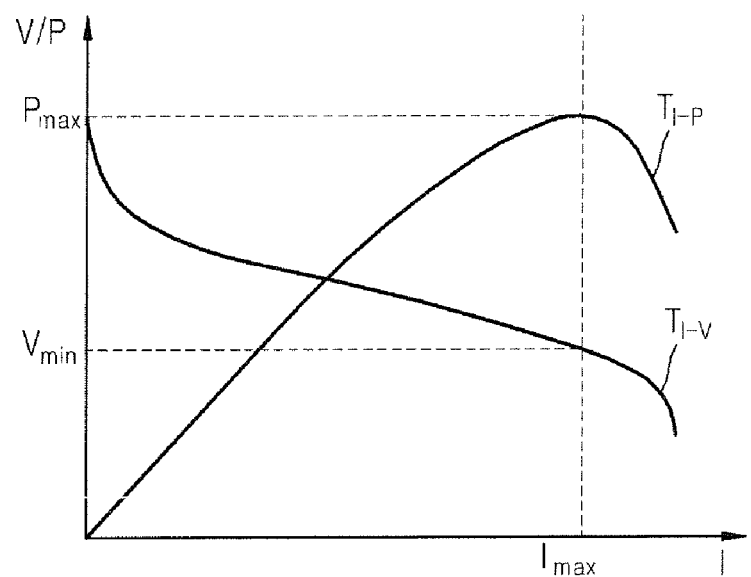
FIG. 1 is a graph of voltage and power vs. current of a fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a graph of voltage and power vs. current of a fuel cell, wherein $T_{I-V}$ and $T_{I-P}$ respectively represent a current-voltage curve and a current-power curve. As illustrated in FIG. 1, the output voltage of the fuel cell decreases as the output current of the fuel cell increases. When the output power is at a maximum value $P_{max}$, the output voltage and the output current are denoted by $V_{min}$ and $I_{max}$, which define an optical operating point.

Figure 2:
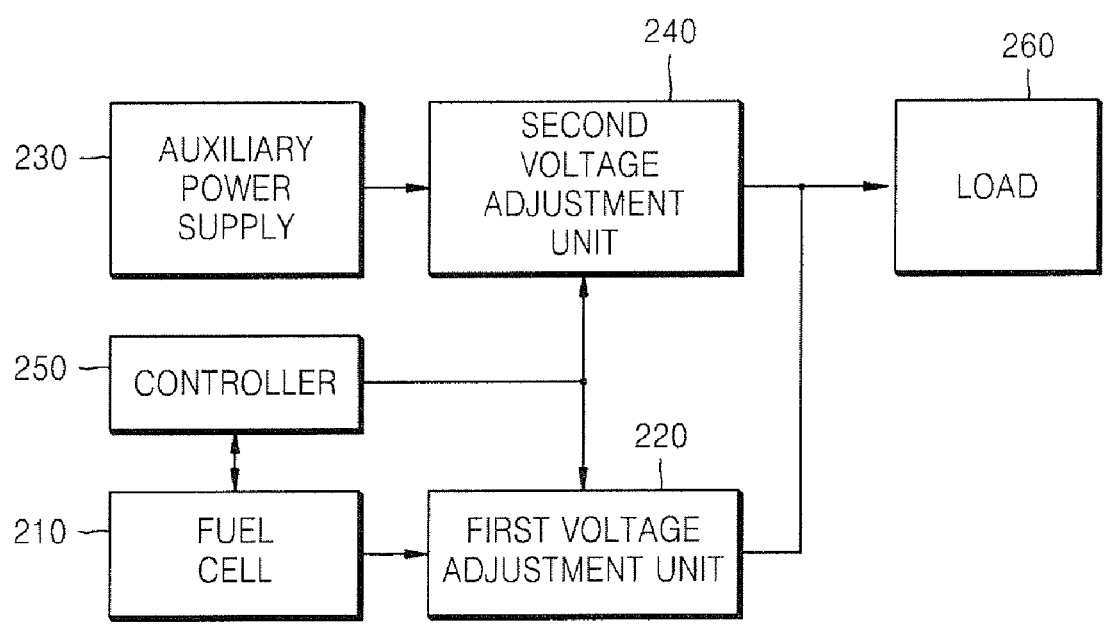
FIG. 2 is a block diagram of a hybrid voltage supply apparatus according to an embodiment of the present invention.

FIG. 2 is a block diagram of a hybrid voltage supply apparatus according to an embodiment of the present invention. Referring to FIG. 2, the hybrid voltage supply apparatus includes a fuel cell 210 used as a main power supply, a first voltage adjustment unit 220 connected between the fuel cell 210 and a load 260, an auxiliary power supply 230 which is a typical battery and may be rechargeable, a second voltage adjustment unit 240 connected between the auxiliary power supply 230 and the load 260, and a controller 250 for controlling an overall operation of the hybrid voltage supply apparatus and controlling the first and second voltage adjustment units 220 and 240.

The first voltage adjustment unit 220 is controlled in either a feed-forward driving mode or a feed-back driving mode. It adjusts the output voltage of the fuel cell 210 to a first predetermined DC voltage, and supplies the first predetermined DC voltage to the load 260.

The second voltage adjustment unit 240 is controlled in a feed-back driving mode. It adjusts the output voltage of the auxiliary power supply 230 to a second predetermined DC voltage, and supplies the second predetermined DC voltage to the load 260.

The controller 250 controls the operation of the first voltage adjustment unit 220 and the second voltage adjustment unit 240 so that the fuel cell 210 can operate at an optimal operating point, i.e. a desired level regardless of the power required by the load 260. Here, the optimal operating point corresponds to an operating point depending on operation conditions of the fuel cell 210, independently from the power required by the load 260. In order to determine whether the fuel cell 210 operates at an optimal operating point, the controller 250 measures operating parameters of the fuel cell 210, compares the operating parameters with corresponding reference values, and controls the first voltage adjustment unit 220 and the second voltage adjustment unit 240 according to the comparison results. Here, the operating parameters may include the temperature, output current, or output voltage of the fuel cell 210, from which the amount of power required by the load 260 may be estimated.

Figure 3A:
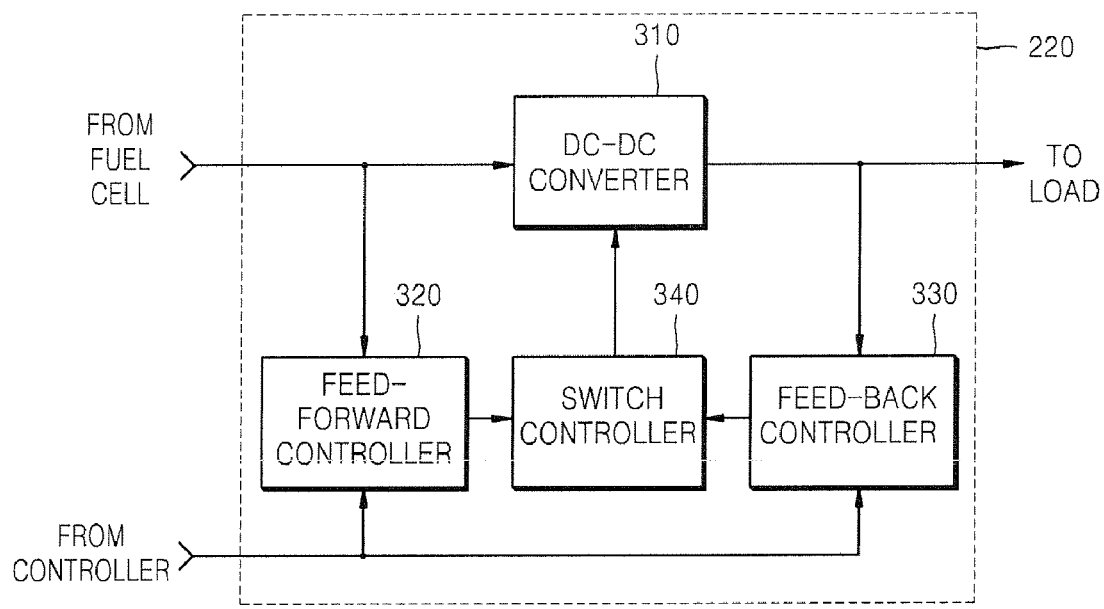
FIGS. 3A and 3B are detailed block diagrams of a first voltage adjustment unit and a second voltage adjustment unit illustrated in FIG. 2, respectively.
Figure 3B:
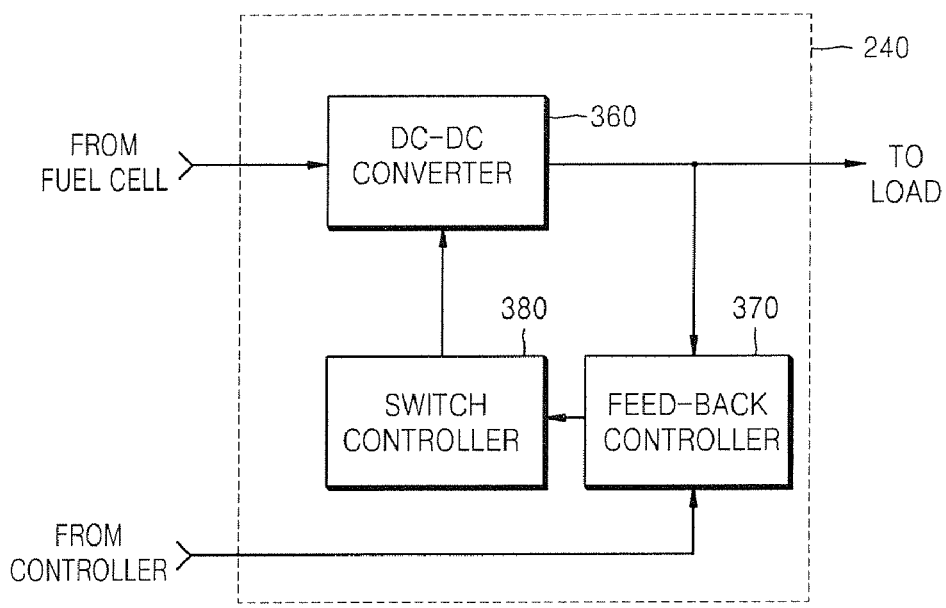

FIGS. 3A and 3B are block diagrams of the first voltage adjustment unit 220 and the second voltage adjustment unit 240 illustrated in FIG. 2, respectively. Referring to FIG. 3A, the first voltage adjustment unit 220 includes a DC-DC converter 310, a feed-forward controller 320, a feed-back controller 330, and a switch controller 340. Referring to FIG. 3B, the second voltage adjustment unit 240 includes a DC-DC converter 360, a feed-back controller 370, and a switch controller 380. The feed-forward controller 320, the feed-back controller 330, and the switch controller 340 constitutes a driving mode determination unit (not shown).

Referring to FIGS. 2 and 3A, in the first voltage adjustment unit 220, the DC-DC converter 310 converts the output voltage of the fuel cell 210 into a first predetermined DC voltage, according to a switch control signal, and applies the first predetermined DC voltage to the load 260. For example, the DC-DC converter 310 may perform the voltage adjustment operation by pulse width modulation.

When the fuel cell 210 does not operate at an optimal operating point, the feed-forward controller 320 controls the DC-DC converter 310 according to a control signal provided from the controller 250 so that the fuel cell 210 can operate at the optimal operating point. When the feed-forward controller 320 operates, the feed-forward controller 320 measures the temperature, output current, or output voltage of the fuel cell 210, compares the measured values with corresponding reference values, and generates a feed-forward driving mode signal according to the comparison result. The temperature of the fuel cell 210 can be measured using, for example, a thermistor.

When the fuel cell 210 does not operate at the optimal operating point, the operation of the feed-back controller 330 is stopped according to a control signal provided from the controller 250. When the fuel cell 210 operates at the optimal operating point, the feed-back controller 330 generates a feed-back driving mode signal under the general feed-back control of the DC-DC converter 310.

The switch controller 340 generates a switch control signal, according to a driving mode signal output from either the feed-forward controller 320 or the feed-back controller 330, and provides the switch control signal to the DC-DC converter 310 to adjust the duty cycle for turn-on and turn-off operations of a switch (not shown).

Referring to FIGS. 2 and 3B, in the second voltage adjustment unit 240, the DC-DC converter 360, whose output terminal is connected in parallel to the output terminal of the DC-DC converter 310, converts the output voltage of the auxiliary power supply 230 into a second predetermined DC voltage and applies the second predetermined DC voltage to the load 260.

When the fuel cell 210 operates at the optimal operating point, the feed-back controller 370 begins to operate according to a control signal provided from the controller 250 and generates a feed-back driving mode signal under the general feed-back control of the DC-DC converter 360. Meanwhile, when the fuel cell 210 does not operate at the optimal operating point, the operation of the feed-back controller 370 is stopped according to a control signal provided from the controller 250.

The switch controller 380 generates a switch control signal using a driving mode signal output from the feed-back controller 370, and provides the switch control signal to the DC-DC converter 360 to adjust the duty cycle of the switch (not shown).

The first predetermined DC voltage may be higher than the second predetermined DC voltage. For example, the first predetermined DC voltage may be 5.0 volts and the second predetermined DC voltage can be 4.8 volts.

Referring to FIGS. 2, 3A, and 3B, because the load 260 requires a large amount of power, the first voltage adjustment unit 220 causes the feed-forward controller 320 to control the temperature, output current, or output voltage of the fuel cell 210 to a value corresponding to the optimal operating point. Here, since the first voltage adjustment unit 220 does not use the feed-back driving mode, the output voltage of the DC-DC converter 310 can become unstable. Accordingly, it is possible to stabilize the voltage applied to the load 260 to the second predetermined DC voltage using the second voltage adjustment unit 240.

Meanwhile, if the power required by the load 260 is within the output power range of the fuel cell 210, the first voltage adjustment unit 220 causes the feed-back controller 330 to stabilize the voltage applied to the load 260 to the first predetermined DC voltage. In this case, the operation of the second voltage adjustment unit 240 is stopped according to a control signal of the controller 250.

Figure 4A:
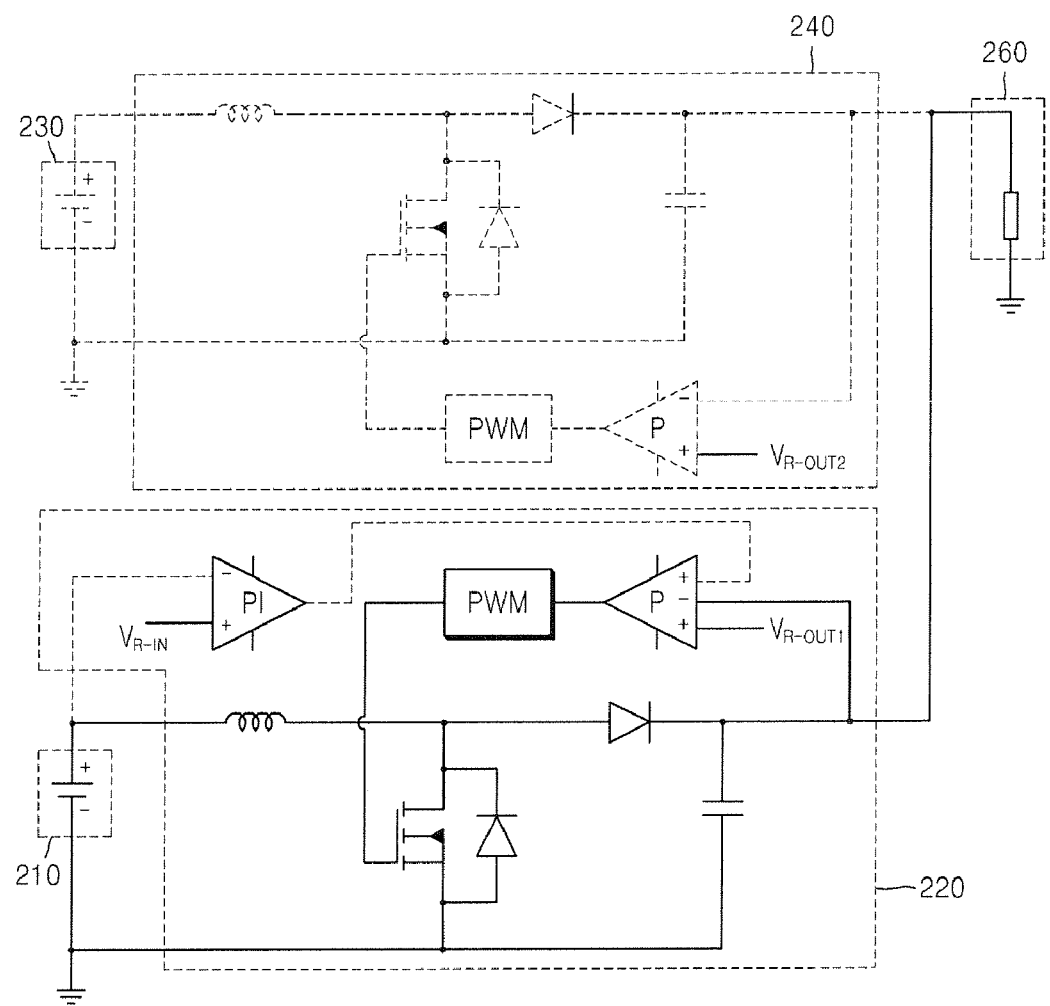
FIGS. 4A and 4B are circuit diagrams of the respective components illustrated in FIG. 2.
Figure 4B:
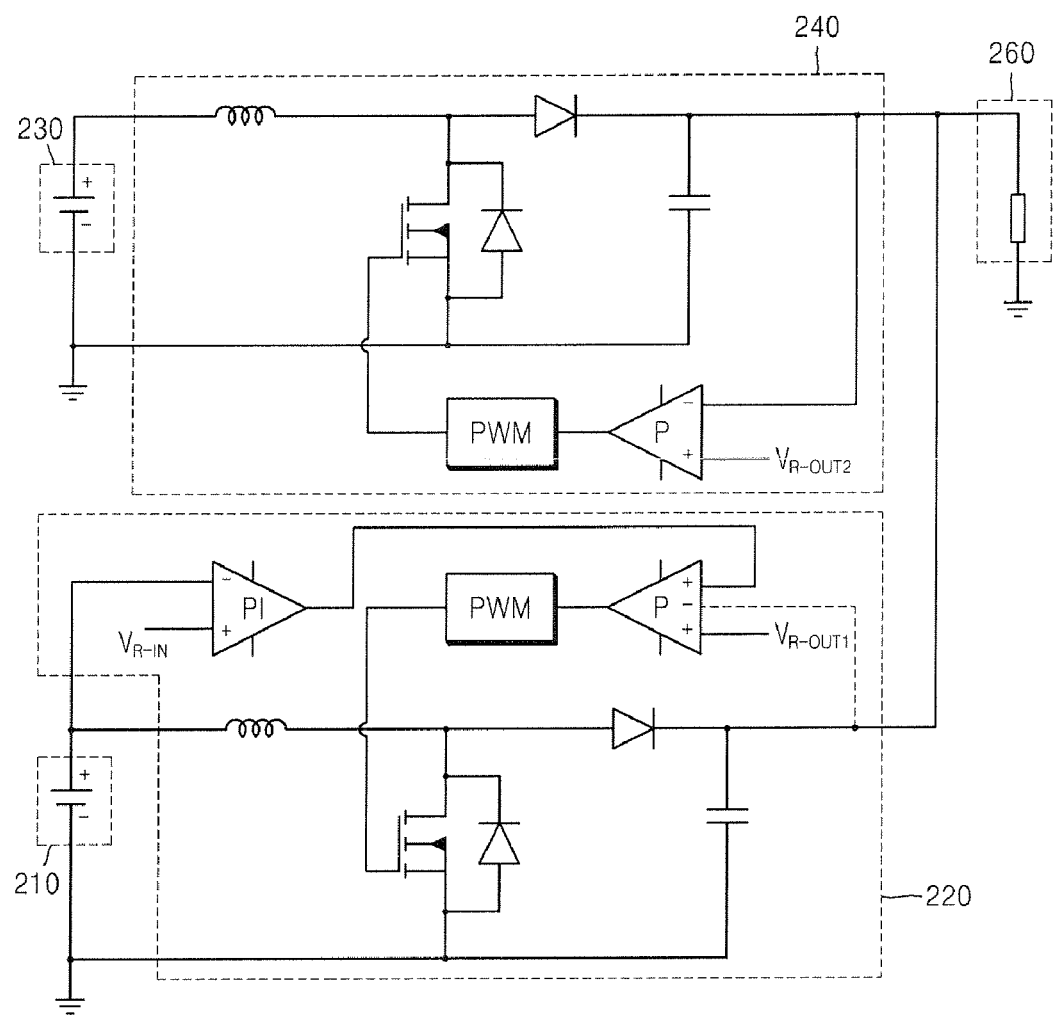

FIGS. 4A and 4B are circuit diagrams of the respective components illustrated in FIG. 2.

FIG. 4A is a view for explaining the operation of the first and second voltage adjustment units 220 and 240, when the power required by the load 260 is equal to or less than the output power of the fuel cell 210, that is, when the output voltage of the fuel cell 210 is higher than the lowest voltage $V_{min}$ corresponding to the optimal operating point.

FIG. 4B is a view for explaining the operation of the first and second voltage adjustment units 220 and 240, when the power required by the load 260 is greater than the output power of the fuel cell 210, that is, when the output voltage of the fuel cell 210 is equal to or less than a lowest voltage $V_{min}$ corresponding to the optimal operating point.

In FIGS. 4A, and 4B in comparison with FIG. 2, the same components are denoted by the same reference numbers, and parts which are operating are denoted by solid lines while parts which are not operating are denoted by dotted lines. The first voltage adjustment unit 220 is controlled in the feed-forward driving mode or the feed-back driving mode by a control signal output from the controller 250. Although the process of determining whether the second voltage adjustment unit 240 operates is not distinctly illustrated in the drawings, the process can be implemented by including a separate switch or including an enable terminal for applying a control signal to the respective components.

In FIGS. 4A and 4B, $V_{R-IN}$ is a reference value that is to be compared with a measured operating parameter of the fuel cell 210, in order to determine whether the fuel cell 210 operates at an optimal operating point and causes the first voltage adjustment unit 220 to generate a feed-forward driving mode signal when the fuel cell 210 does not operate at an optimal operating point. It is preferable that $V_{R-IN}$ be the lowest voltage $V_{min}$ corresponding to the optimal operating point. Meanwhile, $V_{R-OUT1}$ and $V_{R-OUT2}$ are reference values that are to be compared with the output voltages of the DC-DC converters 310 and 360, in order to cause the first and second voltage adjustment units 220 and 240 to generate a feed-back driving mode signal. It is preferable that $V_{R-OUT1}$ and $V_{R-OUT2}$ are first and second predetermined DC voltages.

Figure 5:
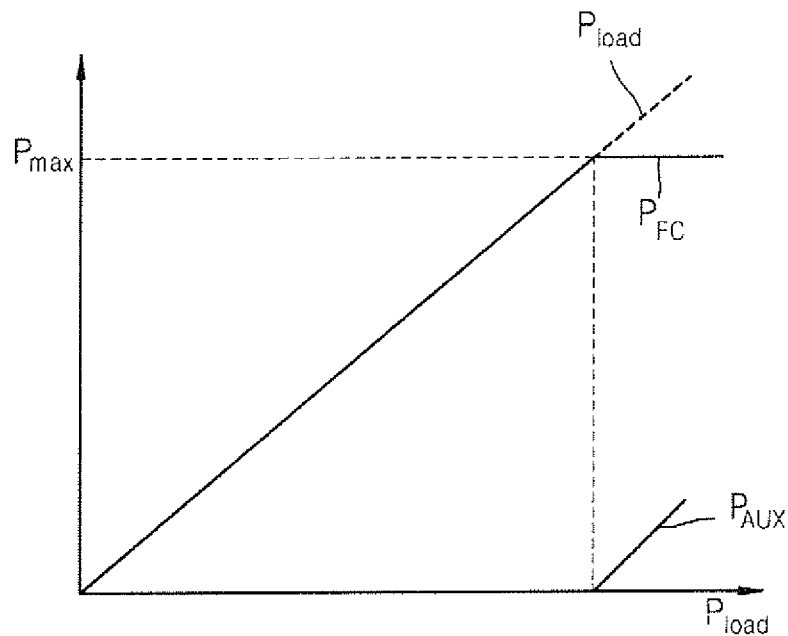
FIG. 5 shows a graph plotting a state in which power required by a load is distributed, according to an embodiment of the present invention.

FIG. 5 is a graph plotting a state in which the power $P_{load}$ required by the load 260 is distributed to the fuel cell 210 and the auxiliary power supply 230, according to an embodiment of the present invention. Referring to FIG. 5, if the power $P_{load}$ required by the load 260 is greater than the output power $P_{FC}$ of the fuel cell 210, that is, if the fuel cell 210 deviates from the optimal operating point, output power $P_{max}$ corresponding to the optimal operating point is distributed to the fuel cell 210, and the remaining output power $P_{AUX}$ obtained by subtracting the output power $P_{max}$ from the power $P_{load}$ required by the load 260 is distributed to the auxiliary power supply 230. If the power $P_{load}$ required by the load 260 is equal to or less than the output power $P_{FC}$ of the fuel cell 210, that is, if the fuel cell 210 does not deviate from the optimal operating point, the output power $P_{FC}$ of the fuel cell 210 is provided to the load 260.

Figure 6:
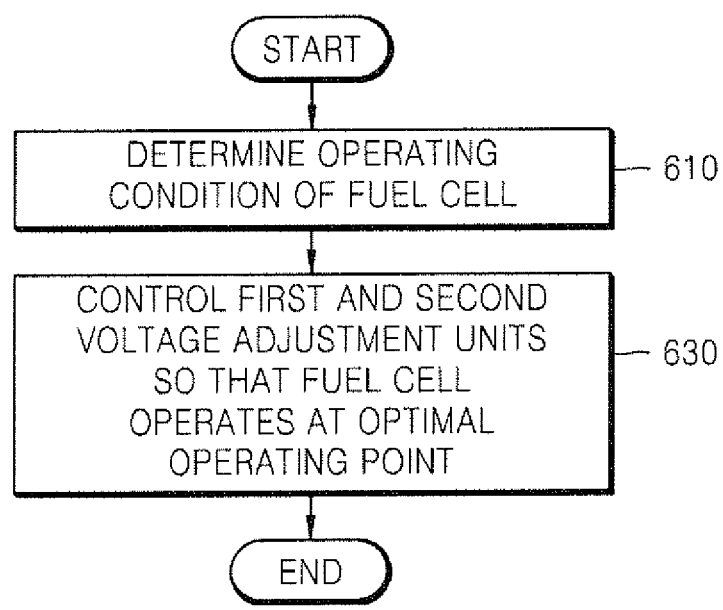
FIG. 6 is a flowchart for explaining a method for controlling the hybrid voltage supply apparatus, according to an embodiment of the present invention.

FIG. 6 is a flowchart for explaining a method for controlling the hybrid voltage supply apparatus, according to an embodiment of the present invention. The method for controlling the hybrid voltage supply apparatus may be preferably performed by the controller 250 illustrated in FIG. 2.

Referring to FIGS. 2 and 6, in operation 610, the operating condition of the fuel cell 210 is determined. Here, the determination of the operating condition of the fuel cell 210 is performed by comparing an operating parameter of the fuel cell 210 with a reference value. The operating parameter may be at least one of the temperature, output current, and output voltage of the fuel cell 210, but is not limited to thereto.

In operation 630, the operation of the first and second voltage adjustment units 220 and 240 is controlled according to the determination result in operation 610, so that the fuel cell 210 operates at an optimal operating point.

Figure 7:
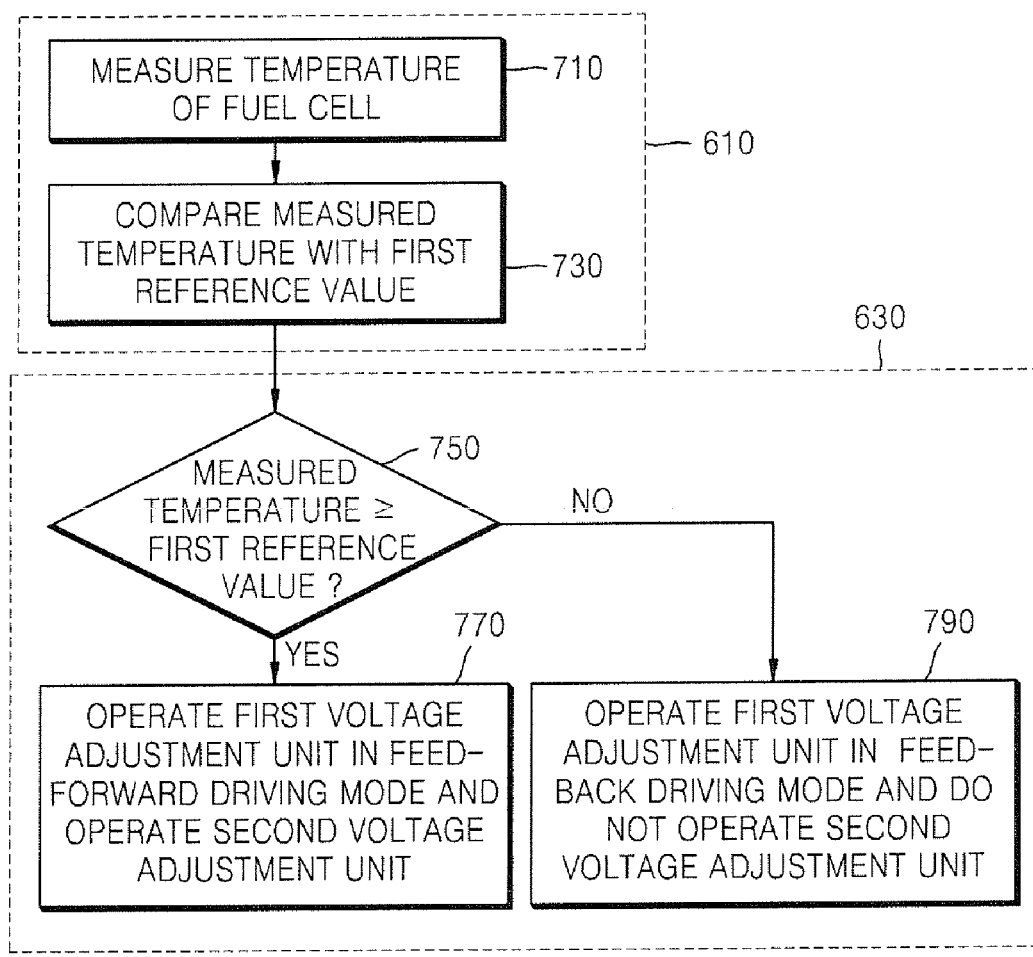
FIG. 7 is a flowchart for explaining the operations illustrated in FIG. 6, according to an embodiment of the present invention.

FIG. 7 is a flowchart for explaining the operations illustrated in FIG. 6, according to an embodiment of the present invention.

Referring to FIG. 7, in operation 710, the temperature of the fuel cell 210 is measured. In operation 730, the temperature measured in operation 710 is compared with a first reference value.

If the measured temperature of the fuel cell 210 is equal to or greater than the first reference value, the second voltage adjustment unit 240 operates and simultaneously the first voltage adjustment unit 220 is controlled to operate in the feed-forward driving mode (operations 750 and 770)

If the measured temperature of the fuel cell 210 is less than the first reference value, the second voltage adjustment unit 240 does not operate and the first voltage adjustment unit 220 is controlled to operate in the feed-back driving mode (operations 750 and 790).

Here, the first reference value can be found by simulation or experiment. If the measured temperature is converted into a voltage, the first reference value may be set to the minimum voltage $V_{min}$ corresponding to an optimal operating point.

Figure 8:
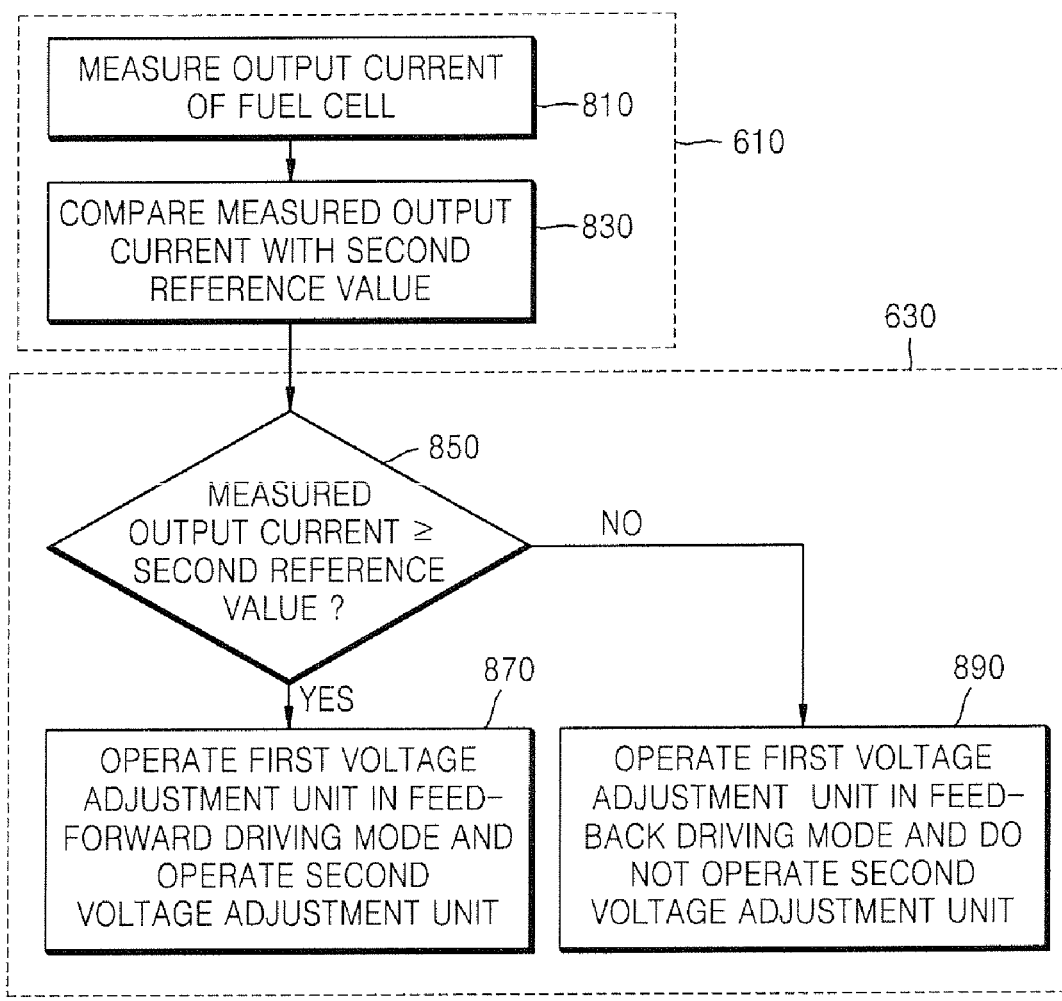
FIG. 8 is a flowchart for explaining the operations illustrated in FIG. 6, according to another embodiment of the present invention.

FIG. 8 is a flowchart for explaining the operations illustrated in FIG. 6, according to an embodiment of the present invention.

Referring to FIG. 8, in operation 810, the output current of the fuel cell 210 is measured. In operation 830, the output current measured in operation 810 is compared with a second reference value.

If the measured output current of the fuel cell 210 is equal to or greater than a second reference value, the second voltage adjustment unit 240 operates and the first voltage adjustment unit 220 is controlled to operate in the feed-forward driving mode (operations 850 and 870).

If the measured output current of the fuel cell 210 is less than the second reference value, the second voltage adjustment unit 240 does not operate and the first voltage adjustment unit 220 is controlled to operate in the feed-back driving mode (operations 850 and 890).

Here, the second reference value can be found by simulation or experiment. If the measured output current is converted into a voltage, the second reference value may be set to the lowest voltage $V_{min}$ corresponding to an optimal operating point.

Figure 9:
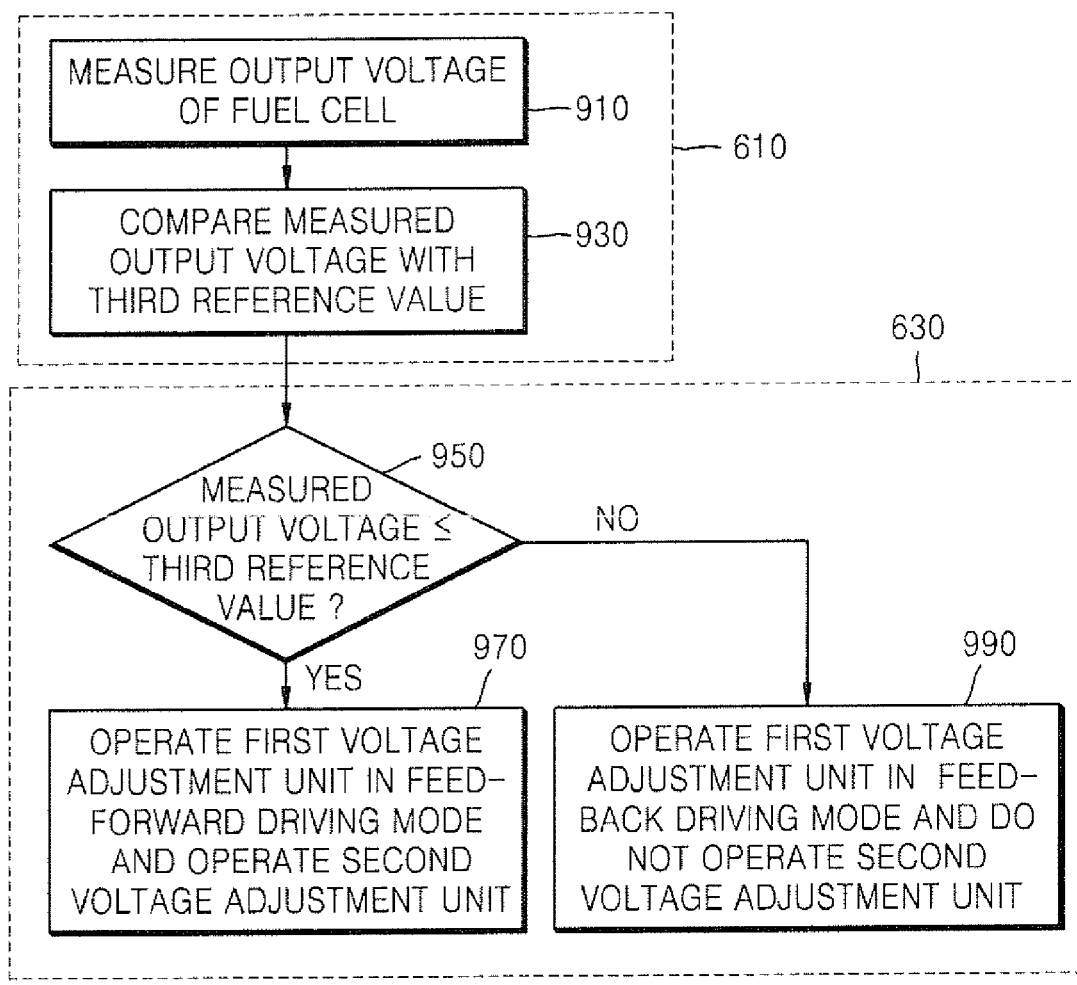
FIG. 9 is a flowchart for explaining the operations illustrated in FIG. 6, according to still another embodiment of the present invention.

FIG. 9 is a flowchart for explaining the operations illustrated in FIG. 6, according to an embodiment of the present invention.

Referring to FIG. 9, in operation 910, the output voltage of the fuel cell 210 is measured. In operation 930, the output voltage measured in operation 910 is compared with a third reference value.

If the measured output voltage of the fuel cell 210 is equal to or less than the third reference value, the second voltage adjustment unit 240 operates and the first voltage adjustment unit 220 is controlled to operate in the feed-forward driving mode (operations 950 and 970)

If the measured output voltage of the fuel cell 210 is greater than the third reference value, the second voltage adjustment unit 240 does not operate and the first voltage adjustment unit 220 is controlled to operate in the feed-back driving mode (operations 950 and 990)

Here, the third reference value can be found by simulation or experiment, and preferably may be set to the lowest voltage $V_{min}$ corresponding to an optimal operating point.

Figure 10:
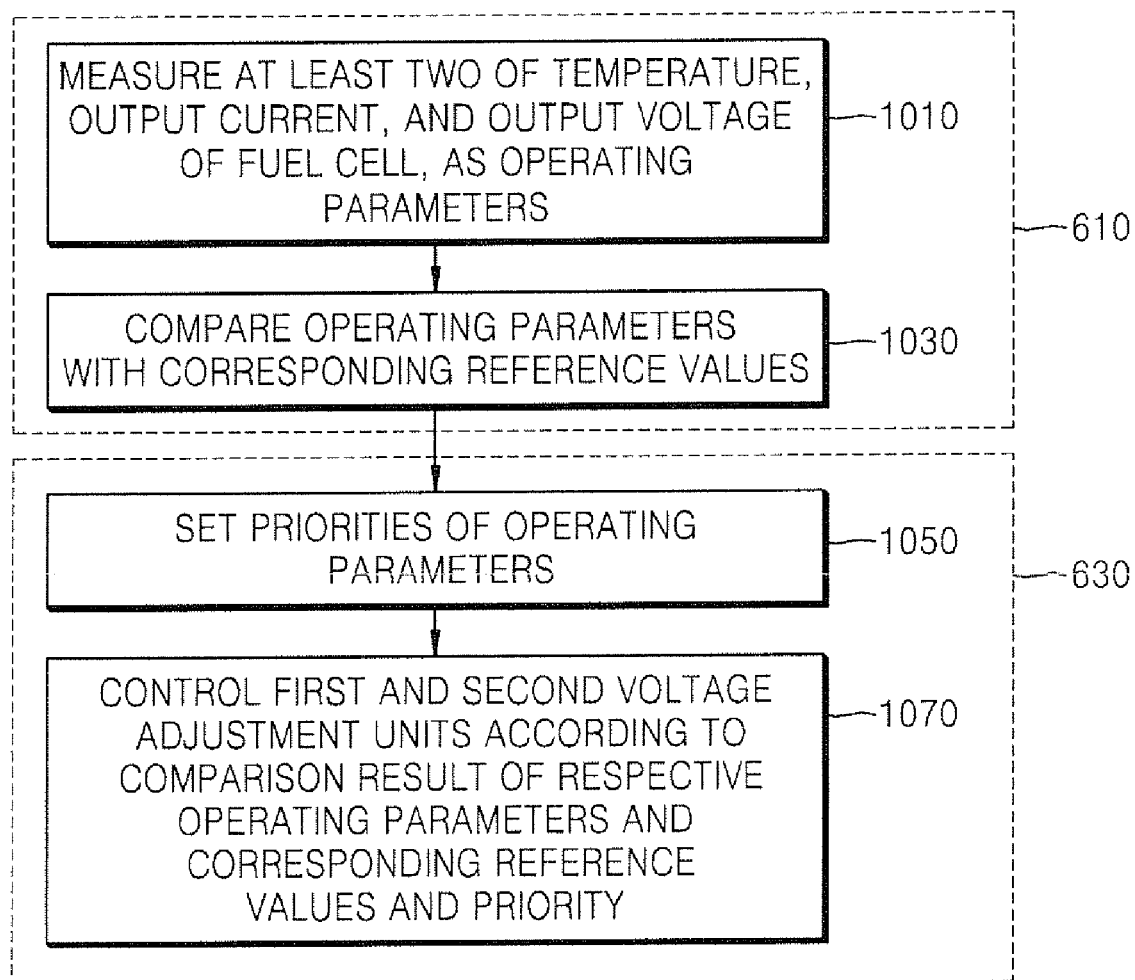
FIG. 10 is a flowchart for explaining the operations illustrated in FIG. 6, according to a further embodiment of the present invention.

FIG. 10 is a flowchart for explaining the operations illustrated in FIG. 6, according to an embodiment of the present invention.

Referring to FIG. 10, in operation 1010, at least two of the temperature, output current, and output voltage of the fuel cell 210 are measured as operating parameters.

In operation 1030, the respective operating parameters measured in operation 1010 are compared with the corresponding reference values.

In operation 1050, the relative priorities of the temperature, output current, and output voltage are set with regard to the operating parameters of the fuel cell 210.

The priorities may be set considering the characteristics of the electronic system (that is, the load 260) using the hybrid voltage supply apparatus, and the performance and efficiency of the fuel cell 210 (FIG. 2), or considering the other factors.

In operation 1070, the operation of the first and second voltage adjustment units 220 and 240 is controlled, according to the comparison results between the operation parameters measured in operation 1030 and the corresponding respective reference values. If it is determined that the fuel cell 210 operates at the optimal operating point, both the first and the second adjustment units 220 and 240 operate and are controlled so that the voltage applied to the load 260 becomes the second predetermined DC voltage. Here, if it is determined that the fuel cell 210 operates at the optimal operating point from two or more operating parameters, one of the operating parameters is selected considering its priority, so as to operate the first voltage adjustment unit 220 in the feed-forward driving mode. Meanwhile, if all the operating parameters indicate that the fuel cell 210 does not operate at the optimal operating point, the first voltage adjustment unit 220 operates and is controlled so that a voltage applied to the load 260 becomes the first predetermined DC voltage.

For convenience of description, in operation 1010, a case where the temperature, output current, and output voltage of the fuel cell 210 are all selected as operating parameters is described as an example. In this case, the temperature, output current, and output voltage of the fuel cell 210 are all measured, and the measured values are compared with the corresponding reference values. If one or more of the operating parameters are in the optimal operating point, that is, if the temperature is equal to or greater than the corresponding reference value, if the output current is equal to or greater than the corresponding reference value, or if the output voltage is equal to or less than the corresponding reference value, the first voltage adjustment unit 220 operates in the feed-forward driving mode and the second voltage adjustment unit 240 operates in the feed-back driving mode, according to the corresponding operating parameter. If two or more of the operating parameters are in the optimal operating point, the first voltage adjustment unit 220 operates in the feed-forward mode and the second voltage adjustment unit 240 operates in the feed-back driving mode, according to the operating parameter having the highest priority. Meanwhile, if all of the operating parameters deviate from the optimal operating point, the first voltage adjustment unit 220 operates in the feed-back driving mode and the second voltage adjustment unit 240 does not operate.

Figure 11:
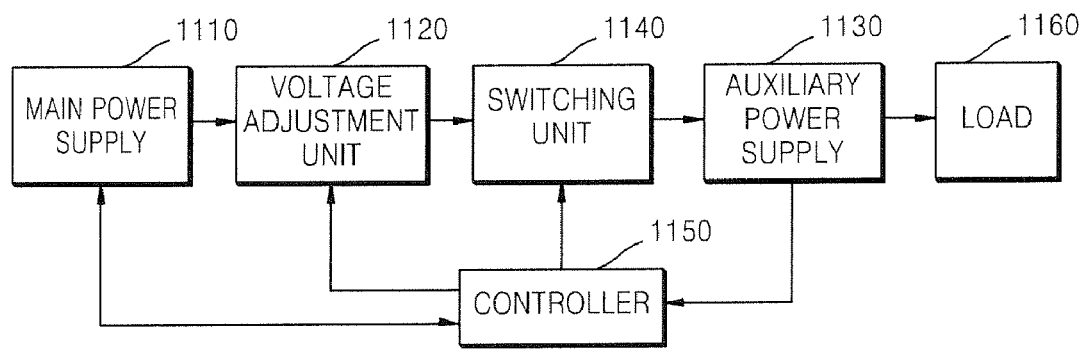
FIG. 11 is a block diagram of a hybrid voltage supply apparatus according to another embodiment of the present invention.

FIG. 11 is a block diagram of a hybrid voltage supply apparatus according to another embodiment of the present invention. Referring to FIG. 11, the hybrid voltage supply apparatus includes a main power supply 1110, a voltage adjustment unit 1120 connected to an output side of the main power supply 1110, an auxiliary power supply 1130, a switching unit 1140 connected between an output side of the voltage adjustment unit 1120 and the auxiliary power supply 1130, and a controller 1150 for controlling an overall operation of the hybrid voltage supply apparatus and controlling the voltage adjustment unit 1120. Here, a load 1160 may be connected to the auxiliary power supply 1130 in parallel.

The main power supply 1110 may be implemented by a battery having a soft voltage-current characteristic, such as a fuel cell. The main power supply 1110 may be implemented by a secondary battery. The soft voltage-current characteristic represents a characteristic by which a current decreases as a voltage increases.

The voltage adjustment unit 1120 operates in either a feed-forward driving mode or a feed-back driving mode, under the control of the controller 1150. The voltage adjustment unit 1120 adjusts the output voltage of the main power supply 1110 to a predetermined DC voltage, and supplies the predetermined DC voltage to the auxiliary power supply 1130. When the load 1160 is connected to the auxiliary power supply 1130, the output voltage of the voltage adjustment unit 1120 is provided to the auxiliary power supply 1130 and the load. In detail, when the switching unit 1140 turns on, and an enable signal from the controller 1150 is applied to the voltage adjustment unit 1120 to commence a charging mode, the voltage adjustment unit 1120 operates in one of two driving modes so that the main power supply 1110 can charge the auxiliary power supply 1130 while operating at an optimal operating point, i.e. a desired level. Here, the optimal operating point corresponds to an operating point depending on operation conditions of the main power supply 1110, independently from the power required by the load 1160. In order to determine whether the main power supply 1110 operates at an optimal operating point, the voltage adjustment unit 1120 measures operating parameters of the main power supply 1110, compares the operating parameters with corresponding reference values, and determines the driving mode according to the comparison results. Here, the operating parameters may include temperature, output current, or output voltage of the main power supply 1110, from which the amount of power required by the load 1160 or the operating conditions of the main power supply may be estimated.

The auxiliary power supply 1130 may be implemented by a rechargeable secondary battery, for example, a lithium-ion battery.

The switching unit 1140 performs connection and disconnection operations between the voltage adjustment unit 1120 and the auxiliary power supply 1130. For example, when the hybrid voltage supply apparatus is initially powered on, the output voltage of the auxiliary power supply 1130 is smaller than a predetermined maximum voltage, or a charging current of the auxiliary power supply 1130 is greater than a predetermined current, a turn-on signal from the controller 1150 is provided to the switching unit 1140. That is, when the auxiliary power supply 1130 is not fully charged, or the auxiliary power supply 1130 reaches a full charge state and the load 1160 is connected to the auxiliary power supply 1130, the output voltage of the voltage adjustment unit 1120 is provided to the auxiliary power supply 1130 to commence a charging mode, or to both the auxiliary power supply 1130 and the load 1160. Meanwhile, when the output voltage of the auxiliary power supply 1130 is equal to the predetermined maximum voltage, and the charging current of the auxiliary power supply 1130 is smaller than the 1140. That is, when the auxiliary power supply 1130 reaches the full charge state and the load 1160 is not connected to the auxiliary power supply 1130, the output voltage of the voltage adjustment unit 1120 is not provided to the auxiliary power supply 1130, which results in the completion of the charging mode. In detail, in a case that the auxiliary power supply 1130 is a lithium-ion battery, the charging mode commences if the output voltage of the auxiliary power supply 1130 is smaller that 4.2 V or the charging current of the auxiliary power supply 1130 is greater than 0.1 C, otherwise, the charging mode is completed.

The controller 1150 controls an overall operation of the hybrid voltage supply apparatus including the operation of controlling fuel supply according to an operating parameter such as temperature of a fuel cell when the main power supply 1110 is implemented by the fuel cell. In addition, when the hybrid voltage supply apparatus is initially powered on, the output voltage of the auxiliary power supply 1130 is smaller than a predetermined maximum voltage, or a charging current of the auxiliary power supply 1130 is greater than a predetermined current, the controller 1150 provides a turn-on signal to the switching unit 1140 and an enable signal to the voltage adjustment unit 1120, so as to commence a charging mode and the supply of a voltage to the load 1160. Meanwhile, when the output voltage of the auxiliary power supply 1130 is equal to the predetermined maximum voltage, and the charging current of the auxiliary power supply 1130 is smaller than the predetermined current, the controller 1150 provides a turn-off signal to the switching unit 1140 and a disable signal to the voltage adjustment unit 1120, so as to complete the charging mode and stop voltage supply to the load 1160. Here, the enable signal or the disable signal may be provided to an arbitrary component of the voltage adjustment unit 1120 which is explained later. In an embodiment of the present invention, the enable signal or the disable signal is a feed-forward controller 1220 and a feed-back controller 1230.

Figure 12:
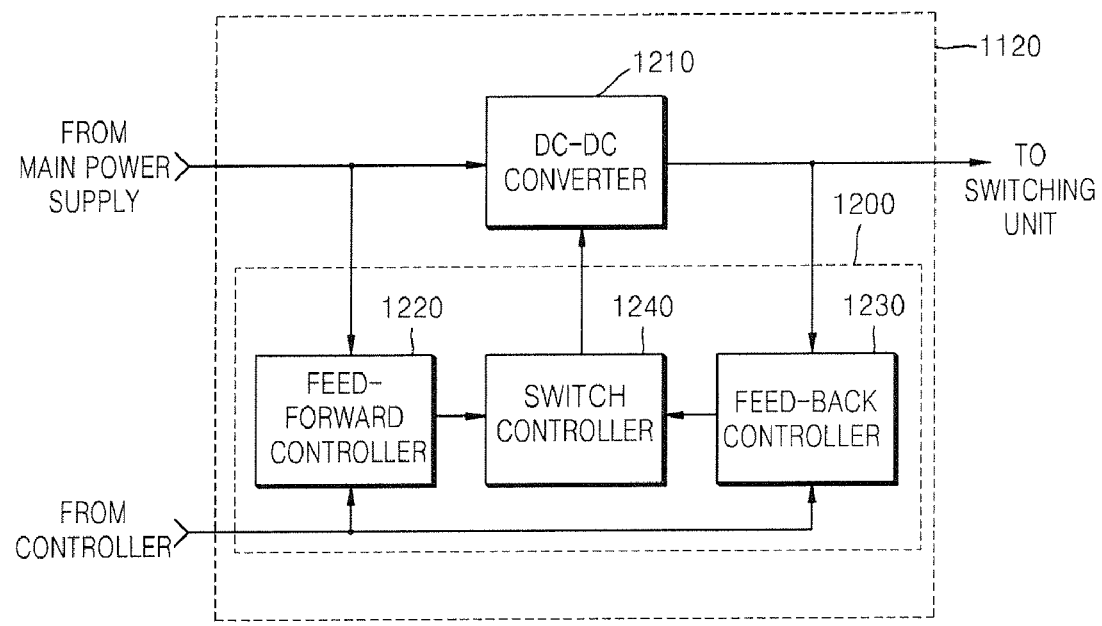
FIG. 12 is a detailed block diagram of the voltage adjustment unit illustrated in FIG. 11.

FIG. 12 is a detailed block diagram of the voltage adjustment unit 1120 illustrated in FIG. 11. Referring to FIG. 12, the voltage adjustment unit 1120 includes a driving mode determination unit 1200 and a DC-DC converter 1210. The driving mode determination unit 1200 includes a feed-forward controller 1220, a feed-back controller 1230, and a switch controller 1240. The voltage adjustment unit 1120 commences the charging mode of the auxiliary power supply 1130 at an enable state and completes the charging mode of the auxiliary power supply 1130 at a disable state.

Referring to FIGS. 11 and 12, in the voltage adjustment unit 1120, the DC-DC converter 1210 converts the output voltage of the main power supply 1110 into a predetermined DC voltage, according to a switch control signal such as a feed-forward driving mode signal or a feed-back driving mode signal provided from the driving mode determination unit 1200, and applies the predetermined DC voltage to the switching unit 1140. For example, the DC-DC converter 1210 may perform the voltage adjustment operation by pulse width modulation. A variety of converters such as a switching type, a boost type, a buck type, a flyback type, or a Cuk type may be used as the DC-DC converter 1210, and in order to obtain a higher efficiency, a switching type converter may be preferably used.

In the driving mode determination unit 1200, the feed-forward controller 1220 controls the output voltage of the main power supply 1110. The feed-forward controller 1220 determines operating conditions of the main power supply 1110 using at least one operating parameter measured from the main power supply 1110. When the main power supply 1110 does not operate at an optimal operating point, the feed-forward controller 1220 controls the DC-DC converter 1210 so that the main power supply 1110 can operate at the optimal operating point in order to provide a stable output voltage. In detail, the feed-forward controller 1220 operates when the output voltage among a plurality of operating parameters of the main power supply 1110 is smaller than a predetermined reference value, i.e. a reference input voltage $V_{R-IN}$ of the DC-DC converter 1210. A signal obtained by the operation of the feed-forward controller 1220 is generated as a first driving mode, i.e. a feed-forward driving mode signal to be provided to the switch controller 1240. By the operation of the feed-forward controller 1220, the output voltage of the main power supply 1110 maintains the reference input voltage $V_{R-IN}$ of the DC-DC converter 1210, and at this time, the output voltage of the auxiliary power supply 1130 is below the reference output voltage $V_{R-OUT}$ of the DC-DC converter 1210. In the DC-DC converter 1210 which operates under a general feed-back control, when the input voltage of the DC-DC converter 1210, i.e. the output voltage of the main power supply 1110 becomes smaller than the reference input voltage $V_{R-IN}$, a switching operation of the DC-DC converter 1210 is performed under a feed-forward control rather than the feed-back control. As a result, the DC-DC converter 1210 does not maintain a predetermined output voltage. In detail, in order to maintain measure the output voltage of the DC-DC converter 1210 so as to adjust an on-duty of the switching operation. But, when the input voltage of the DC-DC converter 1210 becomes smaller than the reference input voltage $V_{R-IN}$, the feed-forward control is performed and the adjustment of the on-duty of the switching operation by the output voltage of the DC-DC converter 1210 cannot be performed. Consequently, by the operation of the feed-forward controller 1220, the output voltage of the DC-DC converter 1210 follows the output voltage of the auxiliary power supply 1130 connected thereto in parallel.

In the above case, when the load 1160 does not exist, the charging current $I_b$ which is provided to the auxiliary power supply 1130 via the switching unit 1140 is determined as a function of the output voltage $V_f$ of the main power supply 1110, the output current $I_f$ of the main power supply 1110, the efficiency $\eta$ of the DC-DC converter 1210, and the output voltage $V_b$ of the auxiliary power supply 1130, as the following equation 1.

$$I_b = V_f \times I_f \times \eta / V_b \quad (1)$$

The charging current $I_b$ of the auxiliary power supply 1130 is normally designed not to exceed 1 C, in a case of the lithium-ion battery.

The feed-forward controller 1220 operates according to the comparison result of the temperature or the output current of the main power supply 1110 besides the output voltage of the main power supply 1110 to a corresponding reference value. A signal obtained by the operation of the feed-forward controller 1220 is generated as the feed-forward driving mode signal to be provided to the switch controller 1240. The temperature of the main power supply 1110 can be measured using, for example, a thermistor.

The feed-back controller 1230 controls the output voltage of the auxiliary power supply 1130, i.e. the output voltage of the voltage adjustment unit 1120. When the main power supply 1110 does not operates at an optimal operating point, i.e. at a desired level, the feed-back controller 1230 generates a second driving mode, i.e. a feed-back driving mode signal based on a general feed-back control and provides the feed-back driving mode signal to the switch controller 1240. By the operation of the DC-DC converter 1210, i.e. the output voltage of the auxiliary power supply 1130 maintains a predetermined reference output voltage $V_{R-OUT}$ of the DC-DC converter 1210.

In the above case, the charging current $I_b$ which is provided to the auxiliary power supply 1130 via the switching unit 1140 is determined as a characteristic and capacity of the auxiliary power supply 1130. The power $P_f$ of the main power supply 1110 is determined as a function of the output voltage $V_b$ of the auxiliary power supply 1130, the charging current $I_b$ of the auxiliary power supply 1130, and the efficiency $\eta$ of the DC-DC converter 1210, and, as the following equation 2.

$$P_f = V_b \times I_b / \eta \quad (2)$$

When the feed-back controller 1230 operates, the output voltage of the main power supply 1110 exists between the reference input voltage $V_{R-IN}$ of the DC-DC converter 1210 and the open circuit voltage $V_{OCV}$.

To sum up, during the charging mode of the auxiliary power supply 1130, in the first driving mode, i.e. the feed-forward driving mode, the output voltage of the main power supply 1110 maintains the reference input voltage $V_{R-IN}$ of the DC-DC converter 1210 while the output voltage of the auxiliary power supply 1130 has a value less than the reference output voltage $V_{R-OUT}$ of the DC-DC converter 1210. Meanwhile, in the second driving mode, i.e. the feed-back driving mode, the output voltage of the main power supply 1110 exists between the reference input voltage $V_{R-IN}$ of the DC-DC converter 1210 and the open circuit voltage $V_{OCV}$ while the output voltage of the auxiliary power supply 1130 maintains the reference output voltage $V_{R-OUT}$ of the DC-DC converter 1210.

The switch controller 1240 generates a switch control signal using the first or the second driving mode signal provided from the feed-forward controller 1220 or from the feed-back controller 1230, and provides the switch control signal to the DC-DC converter 1210 to adjust the duty cycle for turn-on and turn-off operations of a switch (not shown).

Figure 13A:
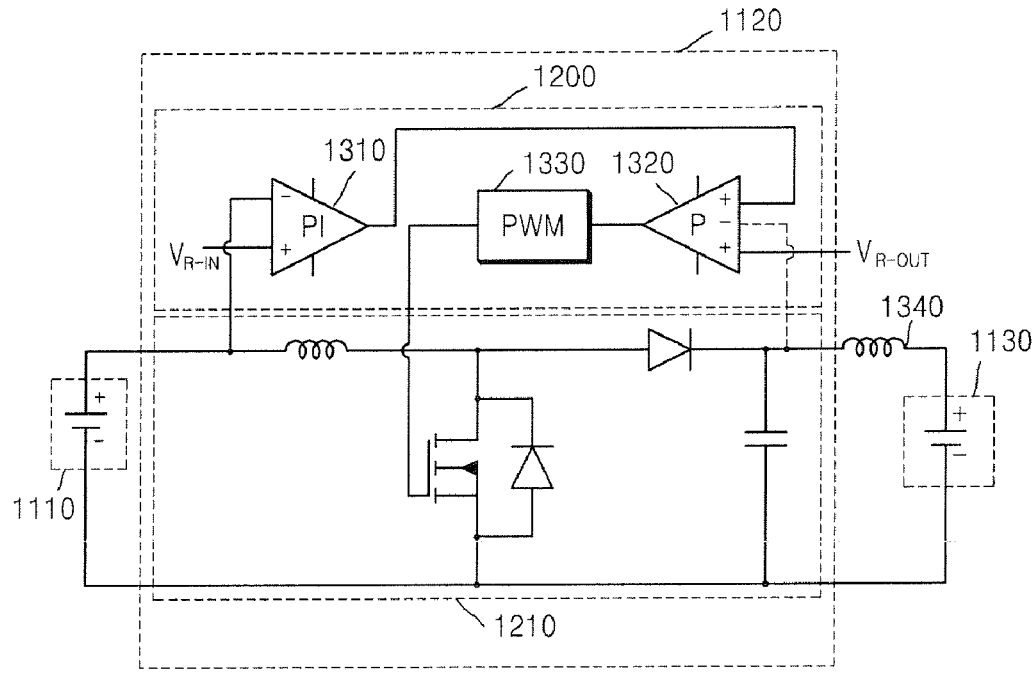
FIGS. 13A and 13B are circuit diagrams of the respective components illustrated in FIG. 12.
Figure 13B:
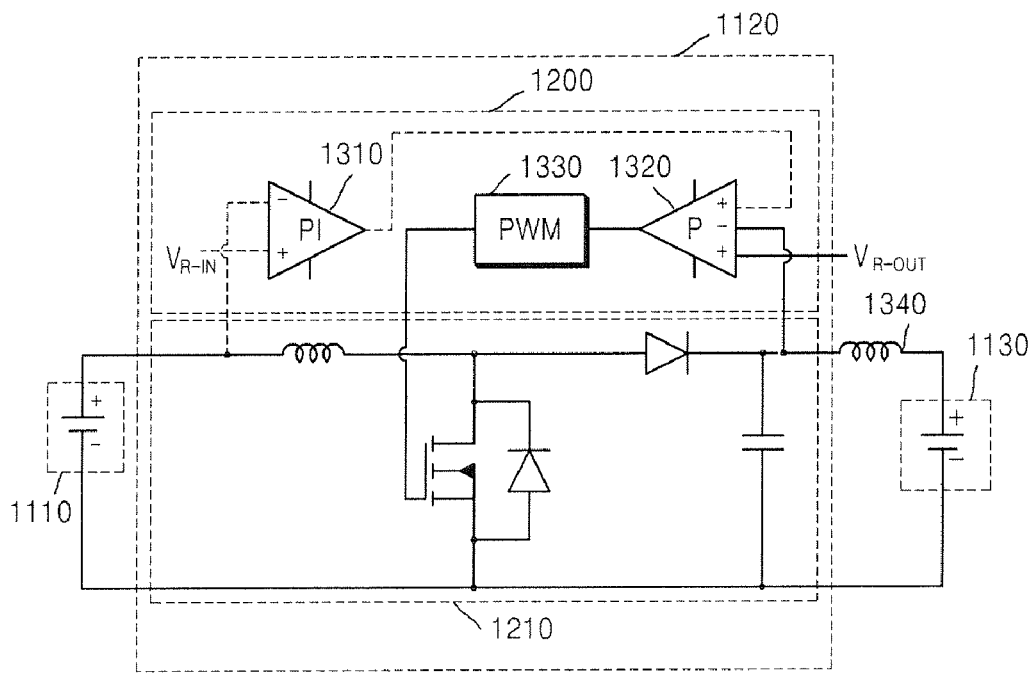

FIGS. 13A and 13B are circuit diagrams of the respective components illustrated in FIG. 12.

FIG. 13A is a view for explaining the operation of the driving mode determination unit 1200, when the output voltage of the main power supply 1110 is equal to or less than a lowest voltage $V_{min}$ corresponding to the optimal operating point, i.e. the reference input voltage $V_{R-IN}$ of the DC-DC converter 1210.

FIG. 13B is a view for explaining the operation of the driving mode determination unit 1200, when the output voltage of the main power supply 1110 is greater than the lowest voltage $V_{min}$ corresponding to the optimal operating point, i.e. the reference input voltage $V_{R-IN}$ of the DC-DC converter 1210. Parts which are operating are denoted by solid lines while parts which are not operating are denoted by dotted lines. The driving mode determination unit 1200 includes a proportional-integral controller 1310, a proportional controller 1320, and a PWM processor 1330 which correspond to the feed-forward controller 1220, the feed-back controller 1230, and the switch controller 1240. The DC-DC converter 1210 adjusts the voltage of the main power supply 1110, for example, between 2.8 V and the open circuit voltage $V_{OCV}$, to the output voltage of the auxiliary power supply 1130, for example, between 3 V and 4.2 V. An inductor 1340 filters high frequency components of the charging current. The inductor 1340 has a small value obtained by the combination of the internal inductance of the switching unit 1140 and the inductance of a connection wire between the voltage adjustment unit 1120 and the auxiliary power supply 1130, when the switching unit 1140 turns on. Therefore, the output voltage of the auxiliary power supply 1130 and the output voltage of the voltage adjustment unit 1120 are substantially the same.

In FIGS. 13A and 13B, $V_{R-IN}$ is a reference value that is to be compared with a measured operating parameter of the main power supply 1110 in order to determine whether the fuel cell operates at an optimal operating point and cause the voltage adjustment unit 1120 to generate a feed-forward driving mode signal when the fuel cell does not operate at the optimal operating point. It is preferable that $V_{R-IN}$ be the lowest voltage $V_{min}$ corresponding to the optimal operating point. Meanwhile, $V_{R-OUT}$ is a reference value that is to be compared with the output voltage of the DC-DC converter 1210, in order to cause the voltage adjustment unit 1120 to generate a feed-back driving mode signal. It is preferable that $V_{R-OUT}$ be the maximum charging voltage of the auxiliary power supply 1130, for example, 4.2 V in a case of the lithium-ion battery.

Referring to FIGS. 13A and 13B, at an initial state or an incomplete charge state, when the output voltage of the DC-DC converter 1210 is less than the reference output voltage $V_{R\text{-}OUT}$, the proportional controller 1320 operates to cause the DC-DC converter to increase its output power, so that the output current of the main power supply 1110, and of the fuel cell increases while the output voltage of the fuel cell decreases. When the output voltage of the fuel cell is less than the reference input voltage $V_{R\text{-}IN}$, the proportional-integral controller 1310 operates to cause the DC-DC converter to be controlled by the first driving mode in which the output power of the DC-DC converter 1210 decreases via the proportional controller 1320 and the PWM processor. When the DC-DC converter operates in the first driving mode, the output voltage of the fuel cell is controlled to maintain the reference input voltage $V_{R\text{-}IN}$, and the output voltage of the DC-DC converter 1210, i.e. the output voltage of the auxiliary power supply 1130 becomes lower than the reference output voltage $V_{R\text{-}OUT}$.

When the auxiliary power supply 1130 reaches a full charge state via the first driving mode, the output voltage of the DC-DC converter 1210 increases up to the reference output voltage $V_{R\text{-}OUT}$, and the output power required by the fuel cell decreases. As a result, when the output voltage of the fuel cell increases and becomes greater than the reference input voltage $V_{R\text{-}IN}$, the proportional-integral controller 1310 reaches a saturation state. Accordingly, by outputting a value close to substantially '0' from the proportional-integral controller 1310, the first driving mode is completed to commence the second driving mode. That is, when the output voltage of the fuel cell is greater than the reference input voltage $V_{R\text{-}IN}$, the DC-DC converter 1210 is determined as the second driving mode in which the DC-DC converter 1210 is controlled by the proportional controller 1320. When the DC-DC converter 1210 operates in the second driving mode, the output voltage of the DC-DC converter 1210, i.e. the output voltage of the auxiliary power supply 1130 becomes substantially the same as the reference output voltage $V_{R\text{-}OUT}$.

Figure 14:
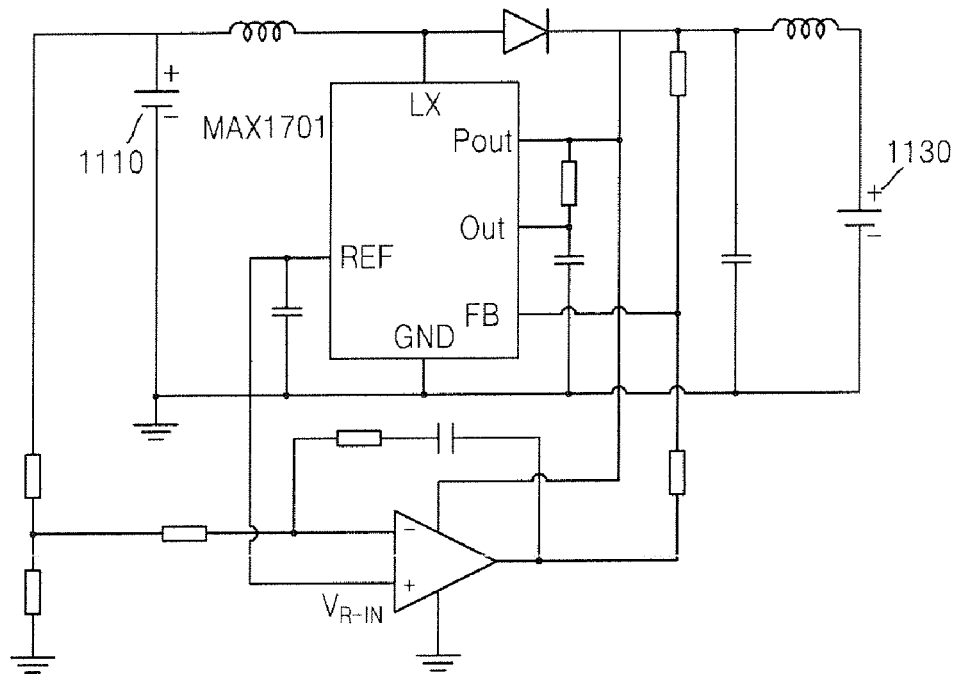
FIG. 14 shows an example of an application circuit of MAX1701 by which an embodiment of the present invention is implemented.

FIG. 14 shows an example of an application circuit of MAX1701 by which an embodiment of the present invention is implemented. Comparing the application circuit of FIG. 14 to the general application circuit of MAX1701, a signal connected to an FB terminal is the combination of a feed-back signal of the output voltage and a feed-forward signal of the input voltage in an embodiment of the present invention while the signal connected to the FB terminal is a feed-back signal of the output voltage in the general application circuit.

Figure 15:
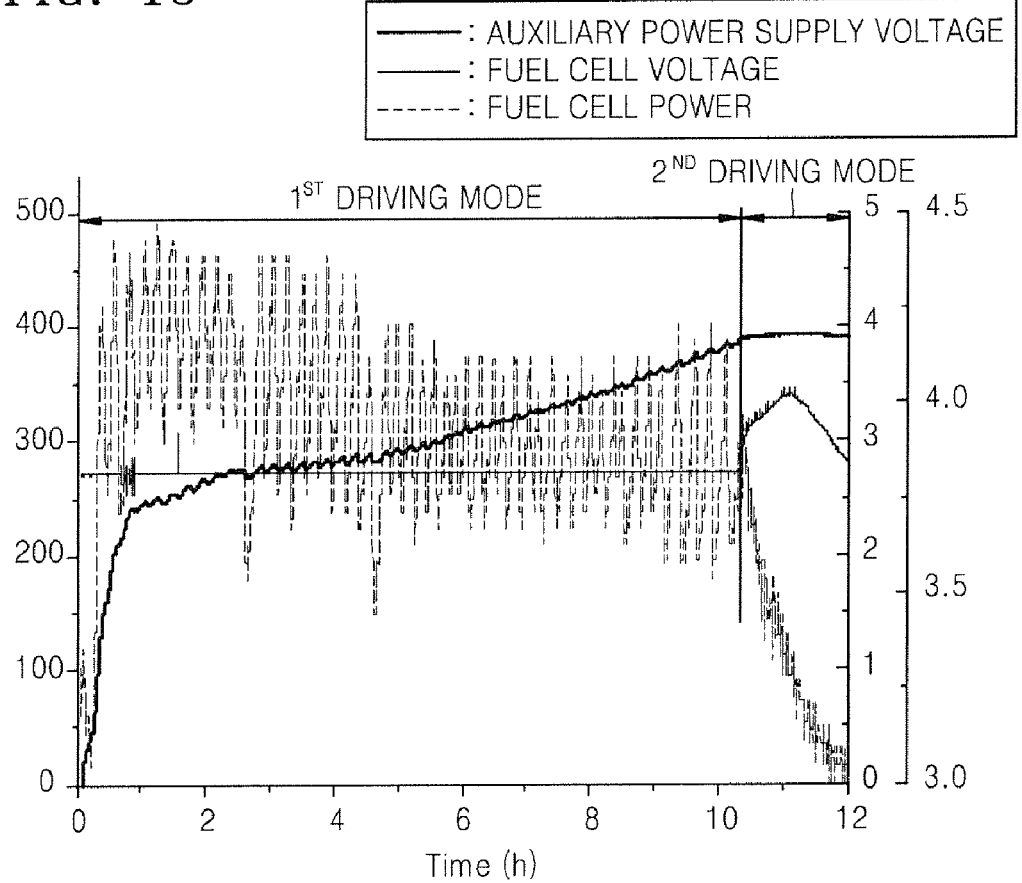
FIG. 15 shows a graph explaining the output voltages of a fuel cell and an auxiliary power supply for each mode, in a hybrid voltage supply apparatus according to an embodiment of the present invention.

FIG. 15 shows a graph explaining output voltages of the main power supply 1110 and the auxiliary power supply 1130 for each driving mode, in a hybrid voltage supply apparatus according to an embodiment of the present invention. The main power supply 1110, and the fuel cell have an average power of 300 mW. Referring to FIG. 15, in the first driving mode, the feed-forward driving mode, and the fuel cell have various power values according to changes in states, and the output value of the fuel cell maintains a constant, 2.8 V. In the second driving mode, the feed-back driving mode, the output value of the auxiliary power supply 1130 is maintained at between 4.17 V and 4.18 V. Accordingly, in the two driving modes, a hybrid voltage supply apparatus according to an embodiment of the present invention can ensure a stable performance and obtain the voltage adjustment unit 1120 with a higher efficiency.

Figure 16:
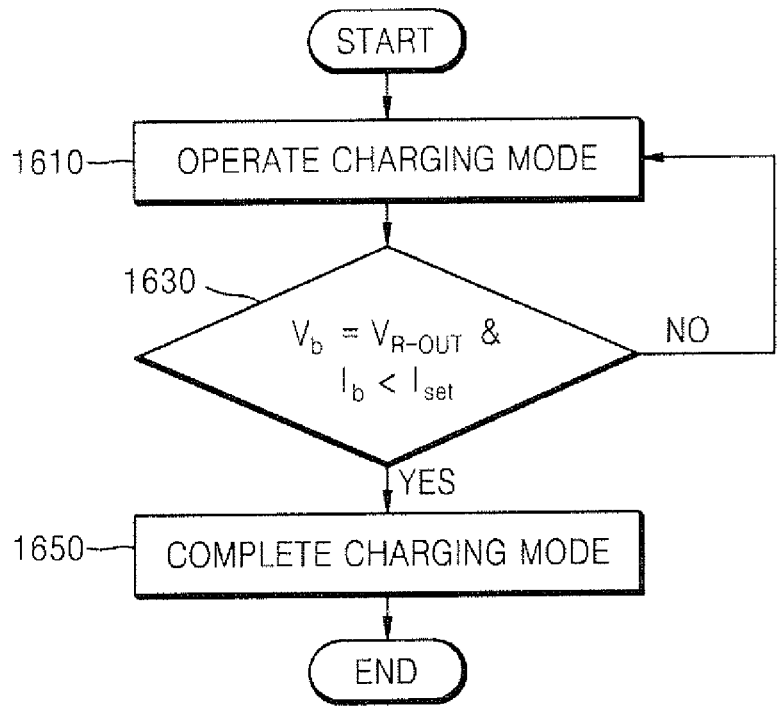
FIG. 16 is a flowchart for explaining a charging process in a method for controlling the hybrid voltage supply apparatus, according to another embodiment of the present invention.

FIG. 16 is a flowchart for explaining a charging process in a method for controlling the hybrid voltage supply apparatus, according to another embodiment of the present invention.

Referring to FIG. 16, in operation 1610, when the hybrid voltage supply apparatus is initially powered on by connecting a load, an output voltage of the auxiliary power supply 1130 is smaller than a predetermined maximum voltage, or a charging current of the auxiliary power supply 1130 is greater than a predetermined current, the controller 1150 provides a turn-on signal to the switching unit 1140 and an enable signal to the voltage adjustment unit 1120, so as to commence a charging mode.

In operation 1630, the output voltage $V_b$ and the charging current $I_b$ of the auxiliary power supply 1130 are monitored.

In operation 1650, the output voltage $V_b$ of the auxiliary power supply 1130 is equal to a predetermined maximum voltage, i.e. a reference output voltage $V_{R\text{-}OUT}$ of DC-DC converter 1210 and the charging current $I_b$ of the auxiliary power supply 1130 is less than a predetermined current $I_{set}$, the controller 1150 provides a turn-off signal to the switching unit 1140 and a disable signal to the voltage adjustment unit 1120, so as to complete the charging mode.

Figure 17:
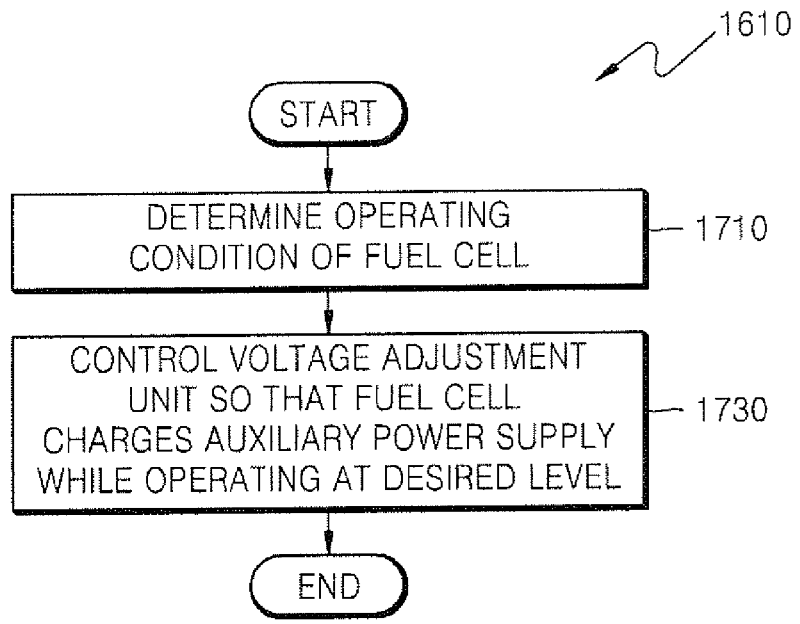
FIG. 17 is a detailed flowchart for explaining the operating charging mode illustrated in FIG. 16, according to an embodiment of the present invention.

FIG. 17 is a detailed flowchart for explaining the operation 1610 illustrated in FIG. 16, according to an embodiment of the present invention.

Referring to FIG. 17, in operation 1710, the operating condition of the main power supply 1110, for example, a fuel cell is determined. Here, the determination of the operating condition of the fuel cell is performed by comparing an operating parameter of the fuel cell with a reference value. The operating parameter may be at least one of the temperature, output current, and output voltage of the fuel cell, but is not limited thereto.

In operation 1730, a driving mode of the voltage adjustment units 1120 is determined according to the determination result in the operation 1710, so that the fuel cell operates at an optimal operating point.

Figure 18:
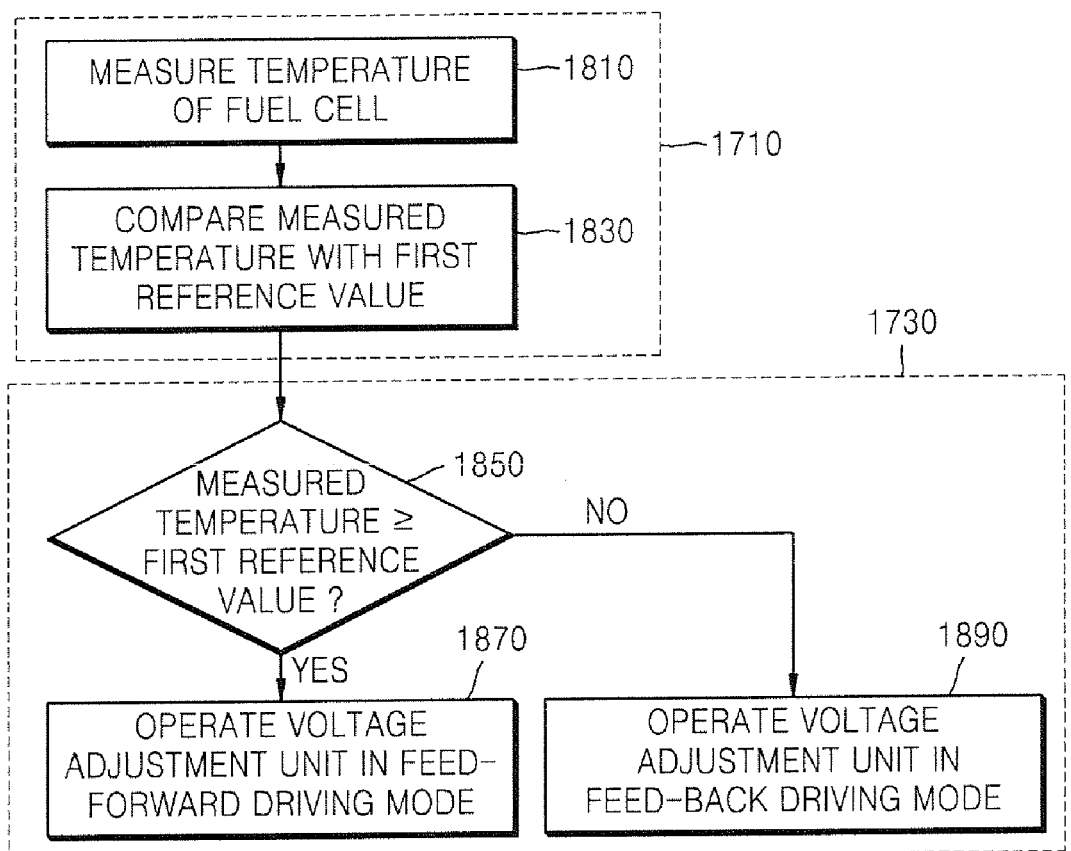
FIG. 18 is a flowchart for explaining the operations illustrated in FIG. 17, according to an embodiment of the present invention.

FIG. 18 is a flowchart for explaining the operations illustrated in FIG. 17, according to an embodiment of the present invention.

Referring to FIG. 18, in operation 1810, the temperature of the fuel cell is measured. In operation 1830, the temperature measured in operation 1810 is compared with a first reference value.

If the measured temperature of the fuel cell is equal to or greater than the first reference value, the voltage adjustment unit 1120 is controlled to operate in the feed-forward driving mode (operations 1850 and 1870).

If the measured temperature of the fuel cell is less than the first reference value, the voltage adjustment unit 1120 is controlled to operate in the feed-back driving mode (operations 1850 and 1890).

Here, the first reference value can be found by simulation or experiment. If the measured temperature is converted into a voltage, the first reference value may be set to the minimum voltage $V_{min}$ corresponding to an optimal operating point, i.e. a reference input voltage $V_{R\text{-}IN}$ of the DC-DC converter 1210.

Figure 19:
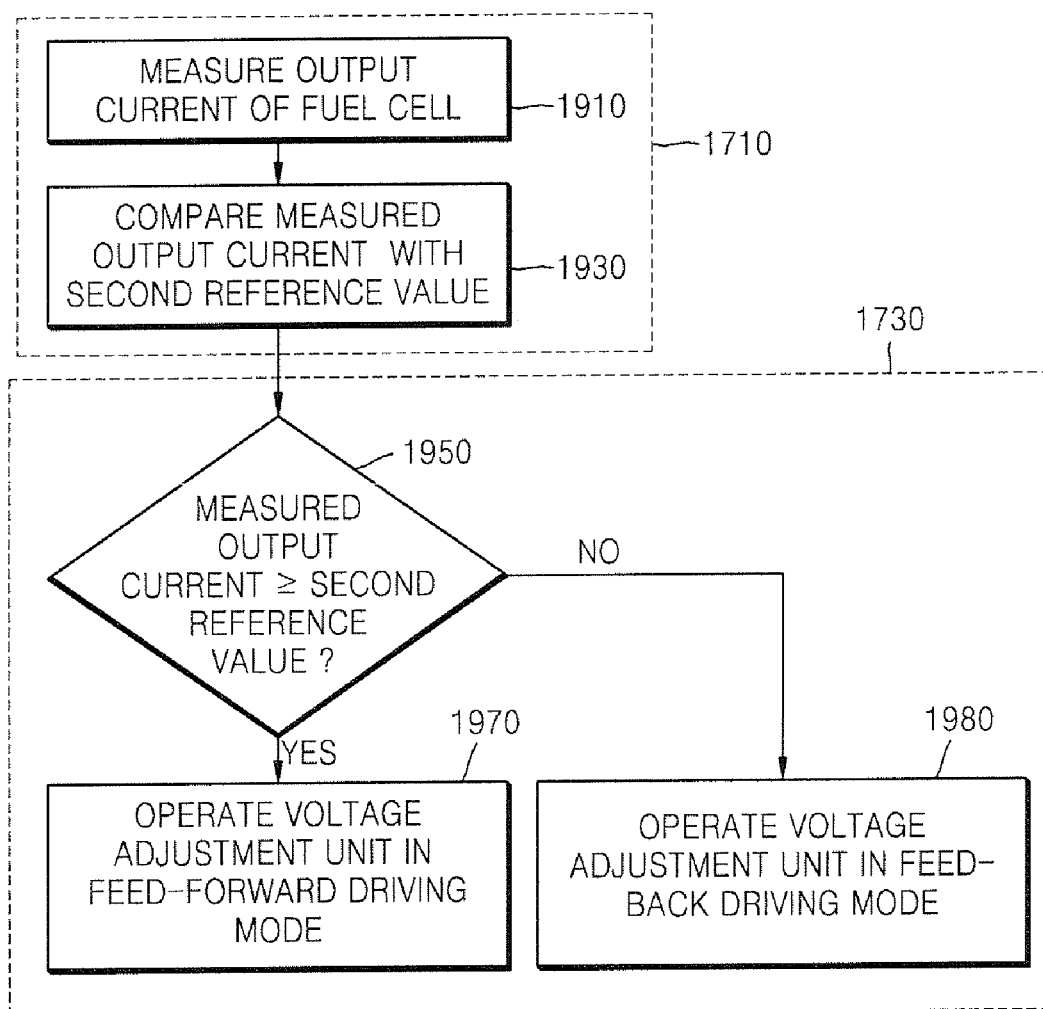
FIG. 19 is a flowchart for explaining the operations illustrated in FIG. 17, according to another embodiment of the present invention.

FIG. 19 is a flowchart for explaining the operations illustrated in FIG. 17, according to an embodiment of the present invention.

Referring to FIG. 19, in operation 1910, the output current of the fuel cell is measured. In operation 1930, the output current measured in operation 1910 is compared with a second reference value.

If the measured output current of the fuel cell is equal to or greater than the second reference value, the voltage adjustment unit 1120 is controlled to operate in the feed-forward driving mode (operations 1950 and 1970).

If the measured output current of the fuel cell is less than the second reference value, the voltage adjustment unit 1120 is controlled to operate in the feed-back driving mode (operations 1950 and 1980).

Here, the second reference value can be found by simulation or experiment. If the measured output current is converted into a voltage, the second reference value may be set to the lowest voltage $V_{min}$ corresponding to an optimal operating point, i.e. a reference input voltage $V_{R-IN}$ of the DC-DC converter 1210.

Figure 20:
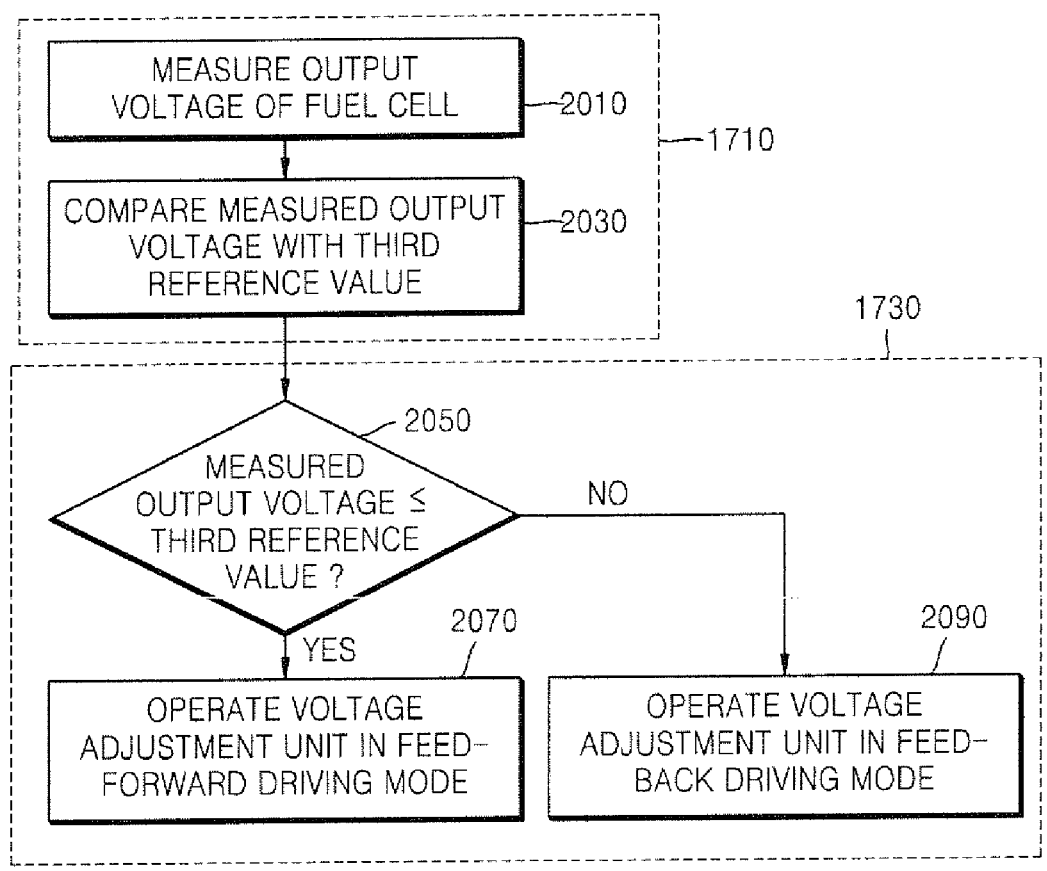
FIG. 20 is a flowchart for explaining the operations illustrated in FIG. 17, according to still another embodiment of the present invention.

FIG. 20 is a flowchart for explaining the operations illustrated in FIG. 17, according to an embodiment of the present invention.

Referring to FIG. 20, in operation 2010, the output voltage of the fuel cell is measured. In operation 2030, the output voltage measured in operation 2010 is compared with a third reference value.

If the measured output voltage of the fuel cell is equal to or less than the third reference value, the voltage adjustment unit 1120 is controlled to operate in the feed-forward driving mode (operations 2050 and 2070)

If the measured output voltage of the fuel cell is greater than the third reference value, the voltage adjustment unit 1120 is controlled to operate in the feed-back driving mode (operations 2050 and 2090)

Here, the third reference value can be found by simulation or experiment, and preferably may be set to the lowest voltage $V_{min}$ corresponding to an optimal operating point, i.e. a reference input voltage $V_{R-IN}$ of the DC-DC converter 1210.

Figure 21:
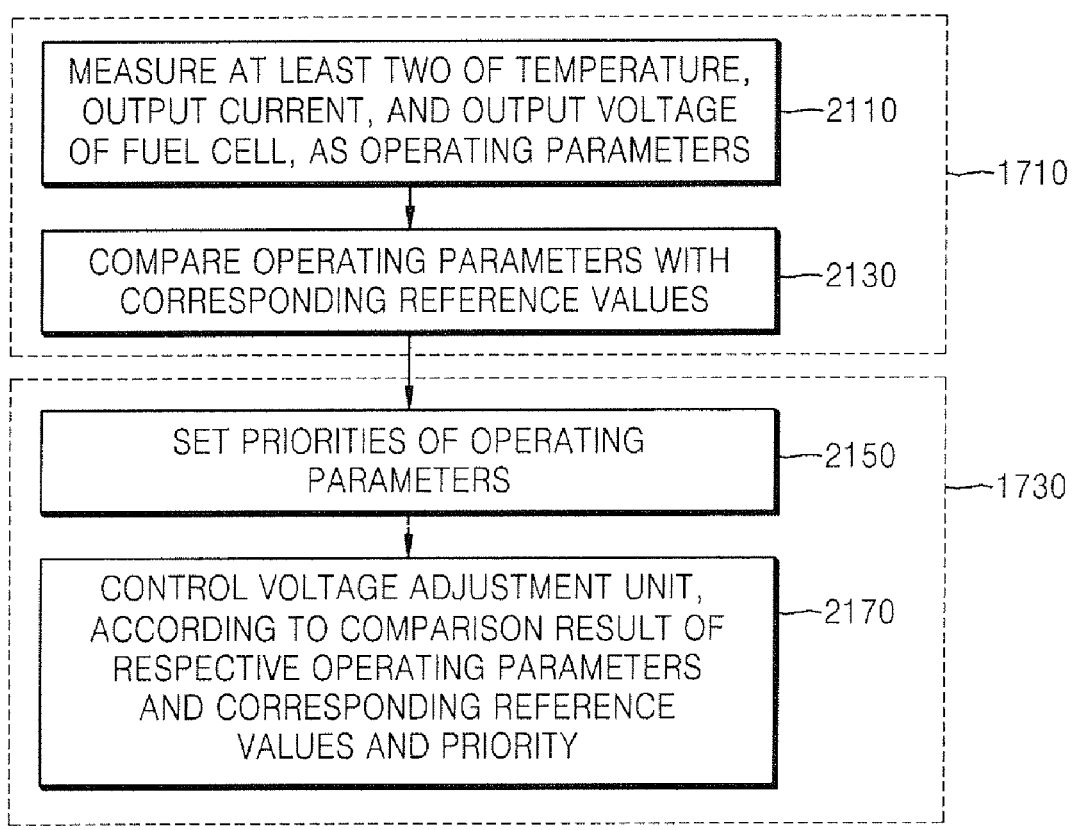
FIG. 21 is a flowchart for explaining the operations illustrated in FIG. 17, according to further embodiment of the present invention.

FIG. 21 is a flowchart for explaining the operations illustrated in FIG. 17, according to an embodiment of the present invention.

Referring to FIG. 21, in operation 2110, at least two of the temperature, output current, and output voltage of the fuel cell are measured as operating parameters.

In operation 2130, the respective operating parameters measured in operation 2110 are compared with the corresponding reference values.

In operation 2150, the relative priorities of the temperature, output current, and output voltage are set with regard to the operating parameters of the fuel cell.

The priorities may be set considering the characteristics of the electronic system (that is, the load) using the hybrid voltage supply apparatus, and the performance and efficiency of the fuel cell, or considering the other factors.

In operation 2170, the operation of the voltage adjustment unit 1120 is controlled, according to the comparison results between the operation parameters measured in operation 2130 and the corresponding respective reference values. If it is determined that the fuel cell does not operate at the optimal operating point, the voltage adjustment unit 1120 is controlled to operate in a feed-forward driving mode. Here, if it is determined that the fuel cell does not operate at the optimal operating point from two or more operating parameters, one of the operating parameters may be selected considering its priority, so as to operate the voltage adjustment unit 1120 in the feed-forward driving mode.

The hybrid voltage supply apparatus can be used as a power supply of mobile devices, such as notebook computers, PDAs, mobile phones, etc. and various electronic devices, such as home appliances, tracked vehicles, etc.

The aspects of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Also, functional programs, code, and code segments for accomplishing the aspects of the present invention can be easily construed by programmers skilled in the art to which the present invention pertains.

As described above, a hybrid voltage supply apparatus in which a main power supply is combined into an auxiliary power supply includes a voltage adjustment unit which is controlled in either a feed-forward driving mode or a feed-back driving mode and adjusts the output voltage of the main power supply to supply the adjusted output voltage to the auxiliary and/or a load, wherein the main power supply is controlled to operate at a desired level by determining operating conditions of the main power supply. As a result, it is possible to ensure stable performance of the main power supply and high efficiency of the voltage adjustment unit.

In addition, the main power supply charges the auxiliary power supply by using a stable voltage provided from the voltage adjustment unit while operating at a desired level, and preventing the auxiliary power supply from being overcharged. As a result, it is possible to increase the life of the auxiliary power supply while ensuring its stable performance. Also, an electronic system using the hybrid voltage supply apparatus as a power supply has a stable power source, which ensures reliable performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hybrid voltage supply apparatus comprising:
   a main power supply;
   an auxiliary power supply; and
   a first voltage adjustment unit which operates in any one of a feed-forward driving mode and a feed-back driving mode according to at least one operating parameter of the main power supply, and adjusts an output voltage of the main power supply to a first predetermined DC voltage, wherein the first voltage adjustment unit includes:
      a driving mode responsive DC-DC converter configured to adjust the output voltage of the main power supply to the first predetermined DC voltage according to a driving mode; and
      a driving mode determination unit which determines one of the feed-forward driving mode and the feed-back driving mode as the driving mode according to the at least one operating parameter of the main power supply.

2. The hybrid voltage supply apparatus of claim 1 further comprising:
   a second voltage adjustment unit connected to the first voltage adjustment unit in parallel, the second voltage adjustment unit being configured to operate in a feed-back driving mode, and to adjust an output voltage of the auxiliary power supply to a second predetermined DC voltage; and
   a first and second voltage adjustment unit controller configured to control the first voltage adjustment unit and the second voltage adjustment unit, so that the main power supply operates at a desired level in response to the at least one operating parameter of the main power supply.

3. The hybrid voltage supply apparatus of claim 2, wherein the first and second voltage adjustment unit controller controls the second voltage adjustment unit to operate when the first voltage adjustment unit operates in the feed-forward driving mode, and controls the second voltage adjustment unit not to operate when the first voltage adjustment unit operates in the feed-back driving mode.

4. The hybrid voltage supply apparatus of claim 2, wherein the first and second voltage adjustment unit controller is configured such that if the temperature of the main power supply is equal to or greater than a first reference value, the first and second voltage adjustment unit controller operates the second voltage adjustment unit, and controls and operates the first voltage adjustment unit in the feed-forward driving mode, and if the temperature of the main power supply is less than a first reference value, the first and second voltage adjustment unit controller does not operate the second voltage adjustment unit, and controls and operates the first voltage adjustment unit in the feed-back driving mode.

5. The hybrid voltage supply apparatus of claim 2, wherein the first and second voltage adjustment unit controller is configured such that if the output current of the main power supply is equal to or greater than a second reference value, the first and second voltage adjustment unit controller operates the second voltage adjustment unit, and controls and operates the first voltage adjustment unit in the feed-forward driving mode, and if the output current of the main power supply is less than the second reference value, the first and second voltage adjustment unit controller does not operate the second voltage adjustment unit, and controls and operates the first voltage adjustment unit in the feed-back driving mode.

6. The hybrid voltage supply apparatus of claim 2, wherein the first and second voltage adjustment unit controller is configured such that if the output voltage of the main power supply is equal to or less than a third reference value, the first and second voltage adjustment unit controller operates the second voltage adjustment unit, and controls and operates the first voltage adjustment unit in the feed-forward driving mode, and if the output voltage of the main power supply is greater than the third reference value, the first and second voltage adjustment unit controller does not operate the second voltage adjustment unit, and controls and operates the first voltage adjustment unit in the feed-back driving mode.

7. The hybrid voltage supply apparatus of claim 2, wherein the first and second voltage adjustment unit controller uses at least two of a temperature, an output current, and an output voltage of the main power supply as the operating parameters, and controls the first voltage adjustment unit and the second voltage adjustment unit, considering priorities of the operating parameters.

8. The hybrid voltage supply apparatus of claim 2, wherein the first predetermined DC voltage is higher than the second predetermined DC voltage.

9. The hybrid voltage supply apparatus of claim 1, wherein the at least one operating parameter includes a temperature, an output current, and an output voltage of the main power supply.

10. The hybrid voltage supply apparatus of claim 1 further comprising:
a main power supply and first voltage adjustment unit controller which controls the main power supply to charge the auxiliary power supply connected to an output side of the first voltage adjustment unit while operating at the desired level, and controls a driving mode of the first voltage adjustment unit in response to the operating parameter of the main power supply.

11. The hybrid voltage supply apparatus of claim 10 further comprising:
a switching unit which connects the first voltage adjustment unit to the auxiliary power supply, if the auxiliary power supply is not fully charged, and disconnects the first voltage adjustment unit from the auxiliary power supply, if the auxiliary power supply is fully charged and a load is not connected to the auxiliary power supply, under the control of the main power supply and first voltage adjustment unit controller.

12. The hybrid voltage supply apparatus of claim 10, wherein the main power supply and first voltage adjustment unit controller is configured such that if the temperature of the main power supply is equal to or greater than a first reference value, the main power supply and first voltage adjustment unit controller controls and operates the first voltage adjustment unit in the feed-forward driving mode, and if the temperature of the main power supply is less than a first reference value, the main power supply and first voltage adjustment unit controller controls and operates the first voltage adjustment unit in the feed-back driving mode.

13. The hybrid voltage supply apparatus of claim 10, wherein the main power supply and first voltage adjustment unit is configured such that if the output current of the main power supply is equal to or greater than a second reference value, the main power supply and first voltage adjustment unit controller controls and operates the first voltage adjustment unit in the feed-forward driving mode, and if the output current of the main power supply is less than the second reference value, the main power supply and first voltage adjustment unit controller controls and operates the first voltage adjustment unit in the feed-back driving mode.

14. The hybrid voltage supply apparatus of claim 10, wherein the main power supply and first voltage adjustment unit is configured such that if the output voltage of the main power supply is equal to or less than a third reference value, the main power supply and first voltage adjustment unit controller controls and operates the first voltage adjustment unit in the feed-forward driving mode, and if the output voltage of the main power supply is greater than the third reference value, the main power supply and first voltage adjustment unit controller controls and operates the first voltage adjustment unit in the feed-back driving mode.

15. The hybrid voltage supply apparatus of claim 10, wherein the main power supply and first voltage adjustment unit controller uses at least two of a temperature, an output current, and an output voltage of the main power supply as the operating parameters, and controls a driving mode of the first voltage adjustment unit, considering priorities of the operating parameters.

16. An electronic system including a hybrid voltage supply apparatus comprising:
a main power supply;
an auxiliary power supply; and
a first voltage adjustment unit which operates in any one of a feed-forward driving mode and a feed-back driving mode according to at least one operating parameter of the main power supply, and adjusts an output voltage of the main power supply to a first predetermined DC voltage, wherein the first voltage adjustment unit includes:
a DC-DC converter which adjusts the output voltage of the main power supply to the first predetermined DC voltage according to a driving mode; and
a driving mode determination unit which determines one of the feed-forward driving mode and the feed-back driving mode as the driving mode according to the at least one operating parameter of the main power supply.

17. A control method of a hybrid voltage supply apparatus, the hybrid voltage supply apparatus including a main power supply, an auxiliary power supply, and a first voltage adjustment unit that is selectively operable in a feed-forward driving mode and a feed-back driving mode and adjusts an output voltage of the main power supply to a first predetermined DC voltage, the control method comprising:
- determining an operating condition of the main power supply by comparing at least one operating parameter to a corresponding reference value; and
- controlling a driving mode of the first voltage adjustment unit to be a selected one of the feed-forward driving mode and the feed-back driving mode on the basis of a result of the determining of the operating condition of the main power supply, so that the main power supply operates at a desired level.

18. The control method of claim 17 further comprising:
controlling an operation of a second voltage adjustment unit which adjusts an output voltage of the auxiliary power supply to a second predetermined DC voltage, according to the driving mode of the first voltage adjustment unit.

19. The control method of claim 18, wherein the determination of the operating condition of the main power supply comprises:
- measuring a temperature of the main power supply; and
- comparing the temperature with a first reference value,
- wherein the controlling of the first voltage adjustment unit and the second voltage adjustment unit comprises:
- if the temperature is equal to or greater than the first reference value, controlling and operating the first voltage adjustment unit in the feed-forward driving mode while operating the second voltage adjustment unit; and
- if the temperature is less than the first reference value, controlling and operating the first voltage adjustment unit in the feed-back driving mode while not operating the second voltage adjustment unit.

20. The control method of claim 18, wherein the determination of the operating condition of the main power supply comprises:
- measuring an output current of the main power supply; and
- comparing the output current with a second reference value,
- wherein the controlling of the first voltage adjustment unit and the second voltage adjustment unit comprises:
- if the output current is equal to or greater than the second reference value, controlling and operating the first voltage adjustment unit in the feed-forward driving mode while operating the second voltage adjustment unit; and
- if the output current is less than the second reference value, controlling and operating the first voltage adjustment unit in the feed-back driving mode while not operating the second voltage adjustment unit.

21. The control method of claim 18, wherein the determination of the operating condition of the main power supply comprises:
- measuring an output voltage of the main power supply; and
- comparing the output voltage with a third reference value,
- wherein the controlling of the first voltage adjustment unit and the second voltage adjustment unit comprises:
- if the output voltage is equal or less than the third reference value, controlling and operating the first voltage adjustment unit in the feed-forward driving mode while operating the second voltage adjustment unit; and
- if the output voltage is greater than the third reference value, controlling and operating the first voltage adjustment unit in the feed-back driving mode while not operating the second voltage adjustment unit.

22. The control method of claim 18, wherein the determination of the operating condition of the main power supply comprises:
- measuring an output voltage of the main power supply; and
- comparing the output voltage with a third reference value,
- wherein the controlling of the first voltage adjustment unit comprises:
- if the output voltage is equal or less than the third reference value, controlling and operating the first voltage adjustment unit in the feed-forward driving mode while charging the auxiliary power supply; and
- if the output voltage is greater than the third reference value, controlling and operating the first voltage adjustment unit in the feed-back driving mode.

23. The control method of claim 17 further comprising:
controlling the main power supply to charge the auxiliary power supply connected to an output side of the first voltage adjustment unit while operating at the desired level, and controlling a driving mode of the first voltage adjustment unit in response to the operating parameter of the main power supply.

24. The control method of claim 23, wherein the determination of the operating condition of the main power supply comprises:
- measuring a temperature of the main power supply; and
- comparing the temperature with a first reference value,
- wherein the controlling of the first voltage adjustment unit comprises:
- if the temperature is equal to or greater than the first reference value, controlling and operating the first voltage adjustment unit in the feed-forward driving mode while charging the auxiliary power supply; and
- if the temperature is less than the first reference value, controlling and operating the first voltage adjustment unit in the feed-back driving mode.

25. The control method of claim 23, wherein the determination of the operating condition of the main power supply comprises:
- measuring an output current of the main power supply; and
- comparing the output current with a second reference value,
- wherein the controlling of the first voltage adjustment unit comprises:
- if the output current is equal to or greater than the second reference value, controlling and operating the first voltage adjustment unit in the feed-forward driving mode while charging the auxiliary power supply; and
- if the output current is less than the second reference value, controlling and operating the first voltage adjustment unit in the feed-back driving mode.

26. A micro processor or controller having embodied thereon a program for executing a control method of a hybrid voltage supply apparatus, the hybrid voltage supply apparatus including a main power supply, an auxiliary power supply, and a first voltage adjustment unit that is selectively operable in a feed-forward driving mode and a feed-back driving mode and adjusts an output voltage of the main power supply to a first predetermined DC voltage, the control method comprising:
- determining an operating condition of the main power supply by comparing at least one operating parameter to a corresponding reference value; and
- controlling a driving mode of the first voltage adjustment unit to be a selected one of the feed-forward driving mode and the feed-back driving mode on the basis of a result of the determining of the operating condition of the main power supply, so that the main power supply operates at a desired level.

* * * * *